US012032486B2

(12) United States Patent
Basak et al.

(10) Patent No.: US 12,032,486 B2
(45) Date of Patent: Jul. 9, 2024

(54) TRANSIENT SIDE-CHANNEL AWARE ARCHITECTURE FOR CRYPTOGRAPHIC COMPUTING

(71) Applicant: Intel Corporation, Santa Clara, CA (US)

(72) Inventors: Abhishek Basak, Bothell, WA (US); Santosh Ghosh, Hillsboro, OR (US); Michael D. LeMay, Hillsboro, OR (US); David M. Durham, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 374 days.

(21) Appl. No.: 17/560,360

(22) Filed: Dec. 23, 2021

(65) Prior Publication Data

US 2022/0121578 A1 Apr. 21, 2022

(51) Int. Cl.
G06F 12/1027 (2016.01)
G06F 9/38 (2018.01)

(52) U.S. Cl.
CPC ........ *G06F 12/1027* (2013.01); *G06F 9/3818* (2013.01); *G06F 2212/68* (2013.01)

(58) Field of Classification Search
None
See application file for complete search history.

(56) References Cited

U.S. PATENT DOCUMENTS

| 2013/0036314 A1* | 2/2013 | Glew | G06F 21/86 |
| | | | 713/194 |
| 2014/0129794 A1 | 5/2014 | Kaplan et al. | |
| 2017/0083724 A1* | 3/2017 | Chhabra | H04L 9/3242 |
| 2020/0169383 A1 | 5/2020 | Durham et al. | |
| 2022/0107784 A1* | 4/2022 | Favor | G06F 9/30181 |
| 2023/0058863 A1* | 2/2023 | Wang | G06F 21/53 |

OTHER PUBLICATIONS

EPO European Extended Search Report in EP Application Serial No. 22207109.4 mailed on May 24, 2023, 7 pages.

* cited by examiner

*Primary Examiner* — Christopher C Harris
(74) *Attorney, Agent, or Firm* — Alliance IP, LLC

(57) ABSTRACT

In one embodiment, a processor includes circuitry to decode an instruction referencing an encoded data pointer that includes a set of plaintext linear address bits and a set of encrypted linear address bits. The processor also includes circuitry to perform a speculative lookup in a translation lookaside buffer (TLB) using the plaintext linear address bits to obtain physical address, buffer a set of architectural predictor state values based on the speculative TLB lookup, and speculatively execute the instruction using the physical address obtained from the speculative TLB lookup. The processor also includes circuitry to determine whether the speculative TLB lookup was correct and update a set of architectural predictor state values of the core using the buffered architectural predictor state values based on a determination that the speculative TLB lookup was correct.

20 Claims, 10 Drawing Sheets

TRANSIENT SIDE-CHANNEL AWARE ARCHITECTURE FOR CRYPTOGRAPHIC COMPUTING

FIELD

This disclosure relates in general to the field of computer systems, and more particularly, to cryptographic computing.

BACKGROUND

Cryptographic computing may refer to computer system security solutions that employ cryptographic mechanisms inside of processor components to protect data stored by a computing system. The cryptographic mechanisms may be used to encrypt the data itself and/or pointers to the data using keys, tweaks, or other security mechanisms. Cryptographic computing is an important trend in the computing industry, with the very foundation of computing itself becoming fundamentally cryptographic. Cryptographic computing represents a sea change, a fundamental rethinking of systems security with wide implications for the industry.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts.

DETAILED DESCRIPTION

Figure 1:
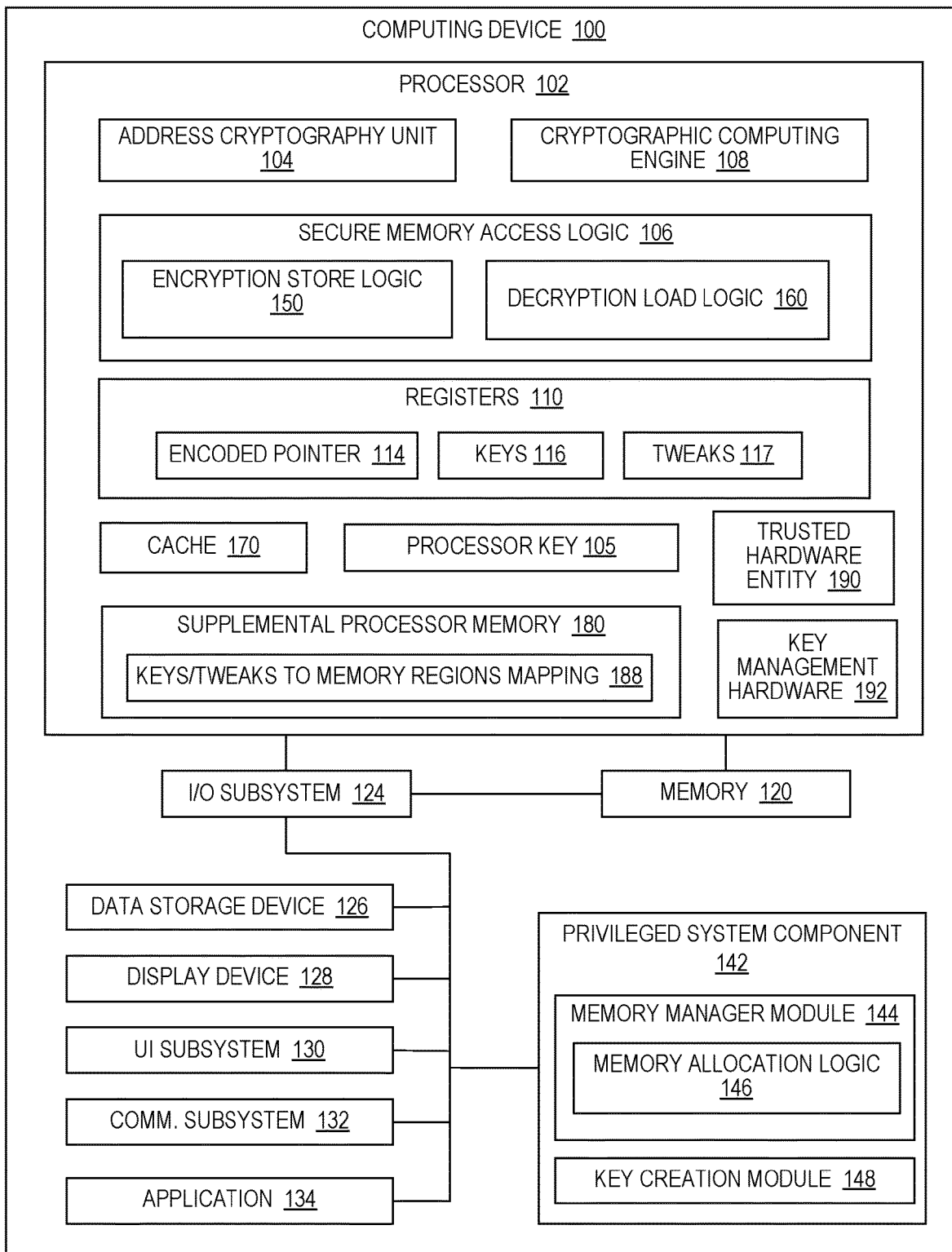
FIG. 1 is a simplified block diagram of an example computing device configured with secure memory access logic according to at least one embodiment of the present disclosure.

This disclosure provides various possible embodiments, or examples, for implementations of memory write instructions that may be used in the context of cryptographic computing. Generally, cryptographic computing may refer to computer system security solutions that employ cryptographic mechanisms inside processor components as part of its computation. Some cryptographic computing systems may implement the encryption and decryption of pointer addresses (or portions thereof), keys, data, and code in a processor core using encrypted memory access instructions. Thus, the microarchitecture pipeline of the processor core may be configured in such a way to support such encryption and decryption operations.

Embodiments disclosed in this application are related to proactively blocking out-of-bound accesses to memory while enforcing cryptographic isolation of memory regions within the memory. Cryptographic isolation may refer to isolation resulting from different regions or areas of memory being encrypted with one or more different parameters. Parameters can include keys and/or tweaks. Isolated memory regions can be composed of objects including data structures and/or code of a software entity (e.g., virtual machines (VMs), applications, functions, threads). Thus, isolation can be supported at arbitrary levels of granularity such as, for example, isolation between virtual machines, isolation between applications, isolation between functions, isolation between threads, isolation between privilege levels (e.g. supervisor vs. user, OS kernel vs. application, VMM vs. VM) or isolation between data structures (e.g., few byte structures).

Encryption and decryption operations of data or code associated with a particular memory region may be performed by a cryptographic algorithm using a key associated with that memory region. In at least some embodiments, the cryptographic algorithm may also (or alternatively) use a tweak as input. Generally, parameters such as 'keys' and 'tweaks' are intended to denote input values, which may be secret and/or unique, and which are used by an encryption or decryption process to produce an encrypted output value or decrypted output value, respectively. A key may be a unique value, at least among the memory regions or subregions being cryptographically isolated. Keys may be maintained, e.g., in either processor registers or processor memory (e.g., processor cache, content addressable memory (CAM), etc.) that is accessible through instruction set extensions but may be kept secret from software. A tweak can be derived from an encoded pointer (e.g., security context information embedded therein) to the memory address where data or code being encrypted/decrypted is stored or is to be stored and, in at least some scenarios, can also include security context information associated with the memory region.

At least some embodiments disclosed in this specification, including read and write operations, are related to pointer based data encryption and decryption in which a pointer to a memory location for data or code is encoded with a tag and/or other metadata (e.g., security context information) and may be used to derive at least a portion of tweak input to data or code cryptographic (e.g., encryption and decryption) algorithms. Thus, a cryptographic binding can be created between the cryptographic addressing layer and data/code encryption and decryption. This implicitly enforces bounds since a pointer that strays beyond the end of an object (e.g., data) is likely to use an incorrect tweak value for that adjacent object. In one or more embodiments, a pointer is encoded with a linear address (also referred to herein as "memory address") to a memory location and metadata. In some pointer encodings, a slice or segment of the address in the pointer includes a plurality of bits and is encrypted (and decrypted) based on a secret address key and a tweak based on the metadata. Other pointers can be encoded with a plaintext memory address (e.g., linear address) and metadata.

For purposes of illustrating the several embodiments for proactively blocking out-of-bound memory accesses while enforcing cryptographic isolation of memory regions, it is important to first understand the operations and activities associated with data protection and memory safety. Accordingly, the following foundational information may be viewed as a basis from which the present disclosure may be properly explained.

Known computing techniques (e.g., page tables for process/kernel separation, virtual machine managers, managed runtimes, etc.) have used architecture and metadata to provide data protection and isolation. For example, in previous solutions, memory controllers outside the CPU boundary support memory encryption and decryption at a coarser granularity (e.g., applications), and isolation of the encrypted data is realized via access control. Typically, a cryptographic engine is placed in a memory controller, which is outside a CPU core. In order to be encrypted, data travels from the core to the memory controller with some identification of which keys should be used for the encryption. This identification is communicated via bits in the physical address. Thus, any deviation to provide additional keys or tweaks could result in increased expense (e.g., for new buses) or additional bits being "stolen" from the address bus to allow additional indexes or identifications for keys or tweaks to be carried with the physical address. Access control can require the use of metadata and a processor would use lookup tables to encode policy or data about the data for ownership, memory size, location, type, version, etc. Dynamically storing and loading metadata requires additional storage (memory overhead) and impacts performance, particularly for fine grain metadata (such as for function as a service (FaaS) workloads or object bounds information).

Cryptographic isolation of memory compartments (also referred to herein as 'memory regions'), resolves many of the aforementioned issues (and more). Cryptographic isolation may make redundant the legacy modes of process separation, user space, and kernel with a fundamentally new fine-grain protection model. With cryptographic isolation of memory compartments, protections are cryptographic, with various types of processor units (e.g., processors and accelerators) alike utilizing secret keys (and optionally tweaks) and ciphers to provide access control and separation at increasingly finer granularities. Indeed, isolation can be supported for memory compartments as small as a one-byte object to as large as data and code for an entire virtual machine. In at least some scenarios, cryptographic isolation may result in individual applications or functions becoming the boundary, allowing each address space to contain multiple distinct applications or functions. Objects can be selectively shared across isolation boundaries via pointers. These pointers can be cryptographically encoded or non-cryptographically encoded. Furthermore, in one or more embodiments, encryption and decryption happens inside the processor core, within the core boundary. Because encryption happens before data is written to a memory unit outside the core, such as the L1 cache or main memory, it is not necessary to "steal" bits from the physical address to convey key or tweak information, and an arbitrarily large number of keys and/or tweaks can be supported.

Cryptographic isolation leverages the concept of a cryptographic addressing layer where the processor encrypts at least a portion of software allocated memory addresses (addresses within the linear/virtual address space, also referred to as "pointers") based on implicit and/or explicit metadata (e.g., context information) and/or a slice of the memory address itself (e.g., as a tweak to a tweakable block cipher (e.g., XOR-encrypt-XOR-based tweaked-codebook mode with ciphertext stealing (XTS)). As used herein, a "tweak" may refer to, among other things, an extra input to a block cipher, in addition to the usual plaintext or ciphertext input and the key. A tweak comprises one or more bits that represent a value. In one or more embodiments, a tweak may compose all or part of an initialization vector (IV) for a block cipher. A resulting cryptographically encoded pointer can comprise an encrypted portion (or slice) of the memory address and some bits of encoded metadata (e.g., context information). When decryption of an address is performed, if the information used to create the tweak (e.g., implicit and/or explicit metadata, plaintext address slice of the memory address, etc.) corresponds to the original allocation of the memory address by a memory allocator (e.g., software allocation method), then the processor can correctly decrypt the address. Otherwise, a random address result will cause a fault and get caught by the processor.

These cryptographically encoded pointers (or portions thereof) may be further used by the processor as a tweak to the data encryption cipher used to encrypt/decrypt data they refer to (data referenced by the cryptographically encoded pointer), creating a cryptographic binding between the cryptographic addressing layer and data/code encryption. In some embodiments, the cryptographically encoded pointer may be decrypted and decoded to obtain the linear address. The linear address (or a portion thereof) may be used by the processor as a tweak to the data encryption cipher. Alternatively, in some embodiments, the memory address may not be encrypted but the pointer may still be encoded with some metadata representing a unique value among pointers. In this embodiment, the encoded pointer (or a portion thereof) may be used by the processor as a tweak to the data encryption cipher. It should be noted that a tweak that is used as input to a block cipher to encrypt/decrypt a memory address is also referred to herein as an "address tweak". Similarly, a tweak that is used as input to a block cipher to encrypt/decrypt data is also referred to herein as a "data tweak".

Although the cryptographically encoded pointer (or non-cryptographically encoded pointers) can be used to isolate data, via encryption, the integrity of the data may still be vulnerable. For example, unauthorized access of cryptographically isolated data can corrupt the memory region where the data is stored regardless of whether the data is encrypted, corrupting the data contents unbeknownst to the victim. Data integrity may be supported using an integrity verification (or checking) mechanism such as message authentication codes (MACS) or implicitly based on an entropy measure of the decrypted data, or both. In one example, MAC codes may be stored per cacheline and evaluated each time the cacheline is read to determine whether the data has been corrupted. Other granularities besides a cacheline may be used per MAC, such as a fraction of a cacheline, 16 bytes of data per MAC, multiple cachelines, pages, etc. MACs may be stored inline with the data or may be stored in a separate memory region indexed to correspond to the data granule associated with each MAC value. Such mechanisms, however, do not proactively detect unauthorized memory accesses. Instead, corruption of memory (e.g., out-of-bounds access) may be detected in a reactive manner (e.g., after the data is written) rather than a proactive manner (e.g., before the data is written). For example, memory corruption may occur by a write operation performed at a memory location that is out-of-bounds for the software entity. With cryptographic computing, the write operation may use a key and/or a tweak that is invalid for the memory location. When a subsequent read operation is performed at that memory location, the read operation may use a different key on the corrupted memory and detect the corruption. For example, if the read operation uses the valid key and/or tweak), then the retrieved data will not decrypt properly and the corruption can be detected using a message authentication code, for example, or by detecting a high level of entropy (randomness) in the decrypted data (implicit integrity).

FIG. 1 is a simplified block diagram of an example computing device 100 for implementing a proactive blocking technique for out-of-bound accesses to memory while enforcing cryptographic isolation of memory regions using secure memory access logic according to at least one embodiment of the present disclosure. In the example shown, the computing device 100 includes a processor 102 with an address cryptography unit 104, a cryptographic computing engine 108, secure memory access logic 106, and memory components, such as a cache 170 (e.g., L1 cache, L2 cache) and supplemental processor memory 180. Secure memory access logic 106 includes encryption store logic 150 to encrypt data based on various keys and/or tweaks and then store the encrypted data and decryption load logic 160 to read and then decrypt data based on the keys and/or tweaks. Cryptographic computing engine 108 may be configured to decrypt data or code for load or fetch operations based on various keys and/or tweaks and to encrypt data or code for store operations based on various keys and/or tweaks. Address cryptography unit 104 may be configured to decrypt and encrypt a linear address (or a portion of the linear address) encoded in a pointer to the data or code referenced by the linear address.

Processor 102 also includes registers 110, which may include e.g., general purpose registers and special purpose registers (e.g., control registers, model-specific registers (MSRs), etc.). Registers 110 may contain various data that may be used in one or more embodiments, such as an encoded pointer 114 to a memory address. The encoded pointer may be cryptographically encoded or non-cryptographically encoded. An encoded pointer is encoded with some metadata. If the encoded pointer is cryptographically encoded, at least a portion (or slice) of the address bits is encrypted. In some embodiments, keys 116 used for encryption and decryption of addresses, code, and/or data may be stored in registers 110. In some embodiments, tweaks 117 used for encryption and decryption of addresses, code, and/or data may be stored in registers 110.

A processor key 105 (also referred to herein as a 'hardware key') may be used for various encryption, decryption, and/or hashing operations and may be configured as a secure key in hardware of the processor 102. Processor key 105 may, for example, be stored in fuses, stored in read-only memory, or generated by a physically unclonable function that produces a consistent set of randomized bits. Generally, processor key 105 may be configured in hardware and known to processor 102, but not known or otherwise available to privileged software (e.g., operating system, virtual machine manager (VMM), firmware, system software, etc.) or unprivileged software. Keys may also be wrapped, or themselves encrypted, to allow secure migration of keying material between platforms to facilitate migration of software workloads.

The secure memory access logic 106 utilizes metadata about encoded pointer 114, which is encoded into unused bits of the encoded pointer 114 (e.g., non-canonical bits of a 64-bit address, or a range of addresses set aside, e.g., by the operating system, such that the corresponding high order bits of the address range may be used to store the metadata), in order to secure and/or provide access control to memory locations pointed to by the encoded pointer 114. For example, the metadata encoding and decoding provided by the secure memory access logic 106 can prevent the encoded pointer 114 from being manipulated to cause a buffer overflow, and/or can prevent program code from accessing memory that it does not have permission to access. Pointers may be encoded when memory is allocated (e.g., by an operating system, in the heap) and provided to executing programs in any of a number of different ways, including by using a function such as malloc, calloc, or new; or implicitly via the loader, or statically allocating memory by the compiler, etc. As a result, the encoded pointer 114, which points to the allocated memory, is encoded with the address metadata.

The address metadata can include valid range metadata. The valid range metadata allows executing programs to manipulate the value of the encoded pointer 114 within a valid range, but will corrupt the encoded pointer 114 if the memory is accessed using the encoded pointer 114 beyond the valid range. Alternatively or in addition, the valid range metadata can be used to identify a valid code range, e.g., a range of memory that program code is permitted to access (e.g. the encoded range information can be used to set explicit ranges on registers). Other information that can be encoded in the address metadata includes access (or permission) restrictions on the encoded pointer 114 (e.g., whether the encoded pointer 114 can be used to write, execute, or read the referenced memory).

In at least some other embodiments, other metadata (or context information) can be encoded in the unused bits of encoded pointer 114 such as a size of plaintext address slices (e.g., number of bits in a plaintext slice of a memory address embedded in the encoded pointer), a memory allocation size (e.g., bytes of allocated memory referenced by the encoded pointer), a type of the data or code (e.g., class of data or code defined by programming language), permissions (e.g., read, write, and execute permissions of the encoded pointer), a location of the data or code (e.g., where the data or code is stored), the memory location where the pointer itself is to be stored, an ownership of the data or code, a version of the encoded pointer (e.g., a sequential number that is incremented each time an encoded pointer is created for newly allocated memory, determines current ownership of the referenced allocated memory in time), a tag of randomized bits (e.g., generated for association with the encoded pointer), a privilege level (e.g., user or supervisor), a cryptographic context identifier (or crypto context ID) (e.g., randomized or deterministically unique value for each encoded pointer), etc. For example, in one embodiment, the address metadata can include size metadata that encodes the size of a plaintext address slice in the encoded pointer. The size metadata may specify a number of lowest order bits in the encoded pointer that can be modified by the executing program. The size metadata is dependent on the amount of memory requested by a program. Accordingly, if 16 bytes are requested, then size metadata is encoded as 4 (or 00100 in five upper bits of the pointer) and the 4 lowest bits of the pointer are designated as modifiable bits to allow addressing to the requested 16 bytes of memory. In some embodiments, the address metadata may include a tag of randomized bits associated with the encoded pointer to make the tag unpredictable for an adversary. An adversary may try to guess the tag value so that the adversary is able to access the memory referenced by the pointer, and randomizing the tag value may make it less likely that the adversary will successfully guess the value compared to a deterministic approach for generating a version value. In some embodiments, the pointer may include a version number (or other deterministically different value) determining current ownership of the referenced allocated data in time instead of or in addition to a randomized tag value. Even if an adversary is able to guess the current tag value or version number for a region of memory, e.g., because the algorithm for generating the version numbers is predictable, the adversary may still be unable to correctly generate the corresponding encrypted portion of the pointer due to the adversary not having access to the key that will later be used to decrypt that portion of the pointer.

The example secure memory access logic 106 is embodied as part of processor instructions (e.g., as part of the processor instruction set architecture), or microcode (e.g., instructions that are stored in read-only memory and executed directly by the processor 102). In other embodiments, portions of the secure memory access logic 106 may be embodied as hardware, firmware, software, or a combination thereof (e.g., as programming code executed by a privileged system component 142 of the computing device 100). In one example, decryption load logic 160 and encryption store logic 150 are embodied as part of new load (read) and store (write) processor instructions that perform respective decryption and encryption operations to isolate memory compartments. Decryption load logic 160 and encryption store logic 150 verify encoded metadata on memory read and write operations that utilize the new processor instructions (e.g., which may be counterparts to existing processor instructions such as MOV), where a general purpose register is used as a memory address to read a value from memory (e.g., load) or to write a value to memory (e.g., store).

The secure memory access logic 106 is executable by the computing device 100 to provide security for encoded pointers "inline," e.g., during execution of a program (such as a user space application 134) by the computing device 100. As used herein, the terms "indirect address" and "pointer" may each refer to, among other things, an address (e.g. virtual address or linear address) of a memory location at which other data or instructions are stored. In an example, a register that stores an encoded memory address of a memory location where data or code is stored may act as a pointer. As such, the encoded pointer 114 may be embodied as, for example, a data pointer (which refers to a location of data), a code pointer (which refers to a location of executable code), an instruction pointer, or a stack pointer. Examples of encoded pointers are further shown and described in U.S. patent application Ser. No. 16/722,342, entitled "Pointer Based Data Encryption," and filed on Dec. 20, 2019, U.S. patent application Ser. No. 16/722,707, entitled "Cryptographic Computing Using Encrypted Base Addresses and Used in Multi-Tenant Environments," and filed on Dec. 20, 2019, and U.S. patent application Ser. No. 16/740,359, entitled "Cryptographic Computing Using Encrypted Base Addresses and Used in Multi-Tenant Environments," and filed on Jan. 10, 2020, each of which is incorporated herein by reference.

As used herein, "context information" includes "metadata" and may refer to, among other things, information about or relating to an encoded pointer 114, such as a valid data range, a valid code range, pointer access permissions, a size of plaintext address slice (e.g., encoded as a power in bits), a memory allocation size, a type of the data or code, a location of the data or code, an ownership of the data or code, a version of the pointer, a tag of randomized bits, version, a privilege level of software, a cryptographic context identifier, etc.

As used herein, "memory access instruction" may refer to, among other things, a "MOV" or "LOAD" instruction or any other instruction that causes data to be read, copied, or otherwise accessed at one storage location, e.g., memory, and moved into another storage location, e.g., a register (where "memory" may refer to main memory or cache, e.g., a form of random access memory, and "register" may refer to a processor register, e.g., hardware), or any instruction that accesses or manipulates memory. Also as used herein, "memory access instruction" may refer to, among other things, a "MOV" or "STORE" instruction or any other instruction that causes data to be read, copied, or otherwise accessed at one storage location, e.g., a register, and moved into another storage location, e.g., memory, or any instruction that accesses or manipulates memory.

The address cryptography unit 104 can include logic (including circuitry) to perform address decoding of an encoded pointer to obtain a linear address of a memory location of data (or code). The address decoding can include decryption if needed (e.g., if the encoded pointer includes an encrypted portion of a linear address) based at least in part on a key and/or on a tweak derived from the encoded pointer. The address cryptography unit 104 can also include logic (including circuitry) to perform address encoding of the encoded pointer, including encryption if needed (e.g., the encoded pointer includes an encrypted portion of a linear address), based at least in part on the same key and/or on the same tweak used to decode the encoded pointer. Address encoding may also include storing metadata in the noncanonical bits of the pointer. Various operations such as address encoding and address decoding (including encryption and decryption of the address or portions thereof) may be performed by processor instructions associated with address cryptography unit 104, other processor instructions, or a separate instruction or series of instructions, or a higher-level code executed by a privileged system component such as an operating system kernel or virtual machine monitor, or as an instruction set emulator. As described in more detail below, address encoding logic and address decoding logic each operate on an encoded pointer 114 using metadata (e.g., one or more of valid range, permission metadata, size (power), memory allocation size, type, location, ownership, version, tag value, privilege level (e.g., user or supervisor), crypto context ID, etc.) and a secret key (e.g., keys 116), in order to secure the encoded pointer 114 at the memory allocation/access level.

The encryption store logic 150 and decryption load logic 160 can use cryptographic computing engine 108 to perform cryptographic operations on data to be stored at a memory location referenced by encoded pointer 114 or obtained from a memory location referenced by encoded pointer 114. The cryptographic computing engine 108 can include logic (including circuitry) to perform data (or code) decryption based at least in part on a tweak derived from an encoded pointer to a memory location of the data (or code), and to perform data (or code) encryption based at least in part on a tweak derived from an encoded pointer to a memory location for the data (or code). The cryptographic operations of the engine 108 may use a tweak, which includes at least a portion of the encoded pointer 114 (or the linear address generated from the encoded pointer) and/or a secret key (e.g., keys 116) in order to secure the data or code at the memory location referenced by the encoded pointer 114 by binding the data/code encryption and decryption to the encoded pointer. Other contextual information may be used for the encryption of data, including what privilege level the processor is currently executing (current privilege level or CPL) or the privileged level of the referenced data. Some embodiments may change the data encryption key used depending on whether the processor is executing in supervisor mode verses user mode or privilege level. Furthermore, some embodiments may select different keys depending on whether the processor is executing in VMX-root or VMX-non-root mode. Similarly, different keys can be used for different processes, virtual machines, compartments, and so on. Multiple factors can be considered when selecting keys, e.g., to select a different key for each of user VMX-root mode, supervisor VMX-root mode, user VMX-non-root mode, and supervisor VMX-non-root mode. Some embodiments may select the key based on the privilege level and mode associated with the data being accessed, even if the processor is currently executing in a different privilege level or mode.

Various different cryptographic algorithms may be used to implement the address cryptography unit 104 and cryptographic computing engine 108. Generally, Advanced Encryption Standard (AES) has been the mainstay for data encryption for decades, using a 128 bit block cipher. Meanwhile, memory addressing is typically 64 bits today. Although embodiments herein may be illustrated and explained with reference to 64-bit memory addressing for 64-bit computers, the disclosed embodiments are not intended to be so limited and can easily be adapted to accommodate 32 bits, 128 bits, or any other available bit sizes for pointers. Likewise, embodiments herein may further be adapted to accommodate various sizes of a block cipher (e.g., 64 bit, 48 bit, 32 bit, 16 bit, etc. using Simon, Speck, tweakable K-cipher, PRINCE or any other block cipher).

Lightweight ciphers suitable for pointer-based encryption have also emerged recently. The PRINCE cipher, for example, can be implemented in 3 clocks requiring as little as 799 um$^2$ of area in the 10 nm process, providing half the latency of AES in a tenth the Silicon area. Cryptographic isolation may utilize these new ciphers, as well as others, introducing novel computer architecture concepts including, but not limited to: (i) cryptographic addressing, e.g., the encryption of data pointers at the processor using, as tweaks, contextual information about the referenced data (e.g., metadata embedded in the pointer and/or external metadata), a slice of the address itself, or any suitable combination thereof; and (ii) encryption of the data itself at the core, using cryptographically encoded pointers or portions thereof, non-cryptographically encoded pointers or portion(s) thereof, contextual information about the referenced data, or any suitable combination thereof as tweaks for the data encryption. A variety of encryption modes that are tweakable can be used for this purpose of including metadata (e.g., counter mode (CTR) and XOR-encrypt-XOR (XEX)-based tweaked-codebook mode with ciphertext stealing (XTS)). In addition to encryption providing data confidentiality, its implicit integrity may allow the processor to determine if the data is being properly decrypted using the correct keystream and tweak. In some block cipher encryption modes, the block cipher creates a keystream, which is then combined (e.g., using XOR operation or other more complex logic) with an input block to produce the encrypted or decrypted block. In some block ciphers, the keystream is fed into the next block cipher to perform encryption or decryption.

The example encoded pointer 114 in FIG. 1 is embodied as a register 110 (e.g., a general purpose register of the processor 102). The example secret keys 116 may be generated by a key creation module 148 of a privileged system component 142, and stored in one of the registers 110 (e.g., a special purpose register or a control register such as a model specific register (MSR)), another memory location that is readable by the processor 102 (e.g., firmware, a secure portion of a data storage device 126, etc.), in external memory, or another form of memory suitable for performing the functions described herein. In some embodiments, tweaks for encrypting addresses, data, or code may be computed in real time for the encryption or decryption. Tweaks 117 may be stored in registers 110, another memory location that is readable by the processor 102 (e.g., firmware, a secure portion of a data storage device 126, etc.), in external memory, or another form of memory suitable for performing the functions described herein. In some embodiments, the secret keys 116 and/or tweaks 117 are stored in a location that is readable only by the processor, such as supplemental processor memory 180. In at least one embodiment, the supplemental processor memory 180 may be implemented as a new cache or content addressable memory (CAM). In one or more implementations, supplemental processor memory 180 may be used to store information related to cryptographic isolation such as keys and potentially tweaks, credentials, and/or context IDs.

Secret keys may also be generated and associated with cryptographically encoded pointers for encrypting/decrypting the address portion (or slice) encoded in the pointer. These keys may be the same as or different than the keys associated with the pointer to perform data (or code) encryption/decryption operations on the data (or code) referenced by the cryptographically encoded pointer. For ease of explanation, the terms "secret address key" or "address key" may be used to refer to a secret key used in encryption and decryption operations of memory addresses and the terms "secret data key" or "data key" may be used to refer to a secret key used in operations to encrypt and decrypt data or code.

On (or during) a memory allocation operation (e.g., a "malloc"), memory allocation logic 146 allocates a range of memory for a buffer, returns a pointer along with the metadata (e.g., one or more of range, permission metadata, size (power), memory allocation size, type, location, ownership, version, tag, privilege level, crypto context ID, etc.). In one example, the memory allocation logic 146 may encode plaintext range information in the encoded pointer 114 (e.g., in the unused/non-canonical bits, prior to encryption), or supply the metadata as one or more separate parameters to the instruction, where the parameter(s) specify the range, code permission information, size (power), memory allocation size, type, location, ownership, version, tag, privilege level (e.g., user or supervisor), crypto context ID, or some suitable combination thereof. Illustratively, the memory allocation logic 146 may be embodied in a memory manager module 144 of the privileged system component 142. The memory allocation logic 146 causes the pointer 114 to be encoded with the metadata (e.g., range, permission metadata, size (power), memory allocation size, type, location, ownership, version, tag value, privilege level, crypto context ID, some suitable combination thereof, etc.). The metadata may be stored in an unused portion of the encoded pointer 114 (e.g., non-canonical bits of a 64-bit address). For some metadata or combinations of metadata, the pointer 114 may be expanded (e.g., 128-bit address, 256-bit address) to accommodate the size of the metadata or combination of metadata.

To determine valid range metadata, example range rule logic selects the valid range metadata to indicate an upper limit for the size of the buffer referenced by the encoded pointer 114. Address adjustment logic adjusts the valid range metadata as needed so that the upper address bits (e.g., most significant bits) of the addresses in the address range do not change as long as the encoded pointer 114 refers to a memory location that is within the valid range indicated by the range metadata. This enables the encoded pointer 114 to be manipulated (e.g., by software performing arithmetic operations, etc.) but only so long as the manipulations do not cause the encoded pointer 114 to go outside the valid range (e.g., overflow the buffer).

In an embodiment, the valid range metadata is used to select a portion (or slice) of the encoded pointer 114 to be encrypted. In other embodiments, the slice of the encoded pointer 114 to be encrypted may be known a priori (e.g., upper 32 bits, lower 32 bits, etc.). The selected slice of the encoded pointer 114 (and the adjustment, in some embodiments) is encrypted using a secret address key (e.g., keys 116) and optionally, an address tweak, as described further below. On a memory access operation (e.g., a read, write, or execute operation), the previously-encoded pointer 114 is decoded. To do this, the encrypted slice of the encoded pointer 114 (and in some embodiments, the encrypted adjustment) is decrypted using a secret address key (e.g., keys 116) and an address tweak (if the address tweak was used in the encryption), as described further below.

The encoded pointer 114 is returned to its original (e.g., canonical) form, based on appropriate operations in order to restore the original value of the encoded pointer 114 (e.g., the true, original linear memory address). To do this in at least one possible embodiment, the address metadata encoded in the unused bits of the encoded pointer 114 are removed (e.g., return the unused bits to their original form). If the encoded pointer 114 decodes successfully, the memory access operation completes successfully. However, if the encoded pointer 114 has been manipulated (e.g., by software, inadvertently or by an attacker) so that its value falls outside the valid range indicated by the range metadata (e.g., overflows the buffer), the encoded pointer 114 may be corrupted as a result of the decrypting process performed on the encrypted address bits in the pointer. A corrupted pointer will raise a fault (e.g., a general protection fault or a page fault if the address is not mapped as present from the paging structures/page tables). One condition that may lead to a fault being generated is a sparse address space. In this scenario, a corrupted address is likely to land on an unmapped page and generate a page fault. Even if the corrupted address lands on a mapped page, it is highly likely that the authorized tweak or initialization vector for that memory region is different from the corrupted address that may be supplied as a tweak or initialization vector in this case. In this way, the computing device 100 provides encoded pointer security against buffer overflow attacks and similar exploits.

Referring now in more detail to FIG. 1, the computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 1, the example computing device 100 includes at least one processor 102 embodied with the secure memory access logic 106, the address cryptography unit 104, and the cryptographic computing engine 108.

The computing device 100 also includes memory 120, an input/output subsystem 124, a data storage device 126, a display device 128, a user interface (UI) subsystem 130, a communication subsystem 132, application 134, and the privileged system component 142 (which, illustratively, includes memory manager module 144 and key creation module 148). The computing device 100 may include other or additional components, such as those commonly found in a mobile and/or stationary computers (e.g., various sensors and input/output devices), in other embodiments. Additionally, in some embodiments, one or more of the example components may be incorporated in, or otherwise form a portion of, another component. Each of the components of the computing device 100 may be embodied as software, firmware, hardware, or a combination of software and hardware.

The processor 102 may be embodied as any type of processor capable of performing the functions described herein. For example, the processor 102 may be embodied as a single or multi-core central processing unit (CPU), a multiple-CPU processor or processing/controlling circuit, or multiple diverse processing units or circuits (e.g., CPU and Graphics Processing Unit (GPU), etc.).

Processor memory may be provisioned inside a core and outside the core boundary. For example, registers 110 may be included within the core and may be used to store encoded pointers (e.g., 114), secret keys 116 and possibly tweaks 117 for encryption and decryption of data or code and addresses. Processor 102 may also include cache 170, which may be L1 and/or L2 cache for example, where data is stored when it is retrieved from memory 120 in anticipation of being fetched by processor 102.

The processor may also include supplemental processor memory 180 outside the core boundary. Supplemental processor memory 180 may be a dedicated cache that is not directly accessible by software. In one or more embodiments, supplemental processor memory 180 may store the mapping 188 between parameters and their associated memory regions. For example, keys may be mapped to their corresponding memory regions in the mapping 188. In some embodiments, tweaks that are paired with keys may also be stored in the mapping 188. In other embodiments, the mapping 188 may be managed by software.

In one or more embodiments, a hardware trusted entity 190 and key management hardware 192 for protecting keys in cryptographic computing may be configured in computing device 100. Hardware trusted entity 190 and key management hardware 192 may be logically separate entities or combined as one logical and physical entity. This entity is configured to provide code and data keys in the form of an encrypted key from which a code, data, or pointer key can be decrypted or a unique key identifier from which a code, data, or pointer key can be derived. Hardware trusted entity 190 and key management hardware 192 may be embodied as circuitry, firmware, software, or any suitable combination thereof. In at least some embodiments, hardware trusted entity and/or key management hardware 190 may form part of processor 102. In at least some embodiments, hardware trusted entity and/or key management hardware 190 may be embodied as a trusted firmware component executing in a privileged state. Examples of a hardware trusted entity can include, but are not necessarily limited to Secure-Arbitration Mode (SEAM) of Intel® Trust Doman Extensions, etc., Intel® Converged Security Management Engine (CSME), an embedded security processor, other trusted firmware, etc.

Generally, keys and tweaks can be handled in any suitable manner based on particular needs and architecture implementations. In a first embodiment, both keys and tweaks may be implicit, and thus are managed by a processor. In this embodiment, the keys and tweaks may be generated internally by the processor or externally by a secure processor. In a second embodiment, both the keys and the tweaks are explicit, and thus are managed by software. In this embodiment, the keys and tweaks are referenced at instruction invocation time using instructions that include operands that reference the keys and tweaks. The keys and tweaks may be stored in registers or memory in this embodiment. In a third embodiment, the keys may be managed by a processor, while the tweaks may be managed by software.

The memory 120 of the computing device 100 may be embodied as any type of volatile or non-volatile memory or data storage capable of performing the functions described herein. Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in memory is synchronous dynamic random access memory (SDRAM). In particular embodiments, DRAM of memory 120 complies with a standard promulgated by the Joint Electron Device Engineering Council (JEDEC), such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Non-volatile memory is a storage medium that does not require power to maintain the state of data stored by the medium. Nonlimiting examples of non-volatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMS), and magnetic storage memory.

In some embodiments, memory 120 comprises one or more memory modules, such as dual in-line memory modules (DIMMs). In some embodiments, the memory 120 may be located on one or more integrated circuit chips that are distinct from an integrated circuit chip comprising processor 102 or may be located on the same integrated circuit chip as the processor 102. Memory 120 may comprise any suitable type of memory and is not limited to a particular speed or technology of memory in various embodiments.

In operation, the memory 120 may store various data and code used during operation of the computing device 100, as well as operating systems, applications, programs, libraries, and drivers. Memory 120 may store data and/or code, which includes sequences of instructions that are executed by the processor 102.

The memory 120 is communicatively coupled to the processor 102, e.g., via the I/O subsystem 124. The I/O subsystem 124 may be embodied as circuitry and/or components to facilitate input/output operations with the processor 102, the memory 120, and other components of the computing device 100. For example, the I/O subsystem 124 may be embodied as, or otherwise include, memory controller hubs, input/output control hubs, firmware devices, communication links (e.g., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 102, the memory 120, and/or other components of the computing device 100, on a single integrated circuit chip.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices. In various embodiments, memory 120 may cache data that is stored on data storage device 126.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing device 100. The display device 128 may be part of the user interface (UI) subsystem 130. The user interface subsystem 130 may include a number of additional devices to facilitate user interaction with the computing device 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing device 100.

The computing device 100 further includes a communication subsystem 132, which may be embodied as any communication circuit, device, or collection thereof, capable of enabling communications between the computing device 100 and other electronic devices. The communication subsystem 132 may be configured to use any one or more communication technology (e.g., wireless or wired communications) and associated protocols (e.g., Ethernet, Bluetooth™, Wi-Fi™, WiMAX, 3G/LTE, etc.) to effect such communication. The communication subsystem 132 may be embodied as a network adapter, including a wireless network adapter.

The example computing device 100 also includes a number of computer program components, such as one or more user space applications (e.g., application 134) and the privileged system component 142. The user space application may be embodied as any computer application (e.g., software, firmware, hardware, or a combination thereof) that interacts directly or indirectly with an end user via, for example, the display device 128 or the UI subsystem 130. Some examples of user space applications include word processing programs, document viewers/readers, web browsers, electronic mail programs, messaging services, computer games, camera and video applications, etc. Among other things, the privileged system component 142 facilitates the communication between the user space application (e.g., application 134) and the hardware components of the computing device 100. Portions of the privileged system component 142 may be embodied as any operating system capable of performing the functions described herein, such as a version of WINDOWS by Microsoft Corporation, ANDROID by Google, Inc., and/or others. Alternatively or in addition, a portion of the privileged system component 142 may be embodied as any type of virtual machine monitor capable of performing the functions described herein (e.g., a type I or type II hypervisor).

The example privileged system component 142 includes key creation module 148, which may be embodied as software, firmware, hardware, or a combination of software and hardware. For example, the key creation module 148 may be embodied as a module of an operating system kernel, a virtual machine monitor, or a hypervisor. The key creation module 148 creates the secret keys 116 (e.g., secret address keys and secret data keys) and may write them to a register or registers to which the processor 102 has read access (e.g., a special purpose register). To create a secret key, the key creation module 148 may execute, for example, a random number generator or another algorithm capable of generating a secret key that can perform the functions described herein. In other implementations, secret keys may be written to supplemental processor memory 180 that is not directly accessible by software. In yet other implementations, secret keys may be encrypted and stored in memory 120. In one or more embodiments, when a data key is generated for a memory region allocated to a particular software entity the data key may be encrypted, and the software entity may be provided with the encrypted data key, a pointer to the encrypted data key, or a data structure including the encrypted key or pointer to the encrypted data key. In other implementations, the software entity may be provided with a pointer to the unencrypted data key stored in processor memory or a data structure including a pointer to the unencrypted data key. Generally, any suitable mechanism for generating, storing, and providing secure keys to be used for encrypting and decrypting data (or code) and to be used for encrypting and decrypting memory addresses (or portions thereof) encoded in pointers may be used in embodiments described herein.

It should be noted that a myriad of approaches could be used to generate or obtain a key for embodiments disclosed herein. For example, although the key creation module 148 is shown as being part of computing device 100, one or more secret keys could be obtained from any suitable external source using any suitable authentication processes to securely communicate the key to computing device 100, which may include generating the key as part of those processes. Furthermore, privileged system component 142 may be part of a trusted execution environment (TEE), virtual machine, processor 102, a co-processor, or any other suitable hardware, firmware, or software in computing device 100 or securely connected to computing device 100. Moreover, the key may be "secret", which is intended to mean that its value is kept hidden, inaccessible, obfuscated, or otherwise secured from unauthorized actors (e.g., software, firmware, machines, extraneous hardware components, and humans). Keys may be changed depending on the current privilege level of the processor (e.g. user vs. supervisor), on the process that is executing, virtual machine that is running, etc.

Figure 2A:
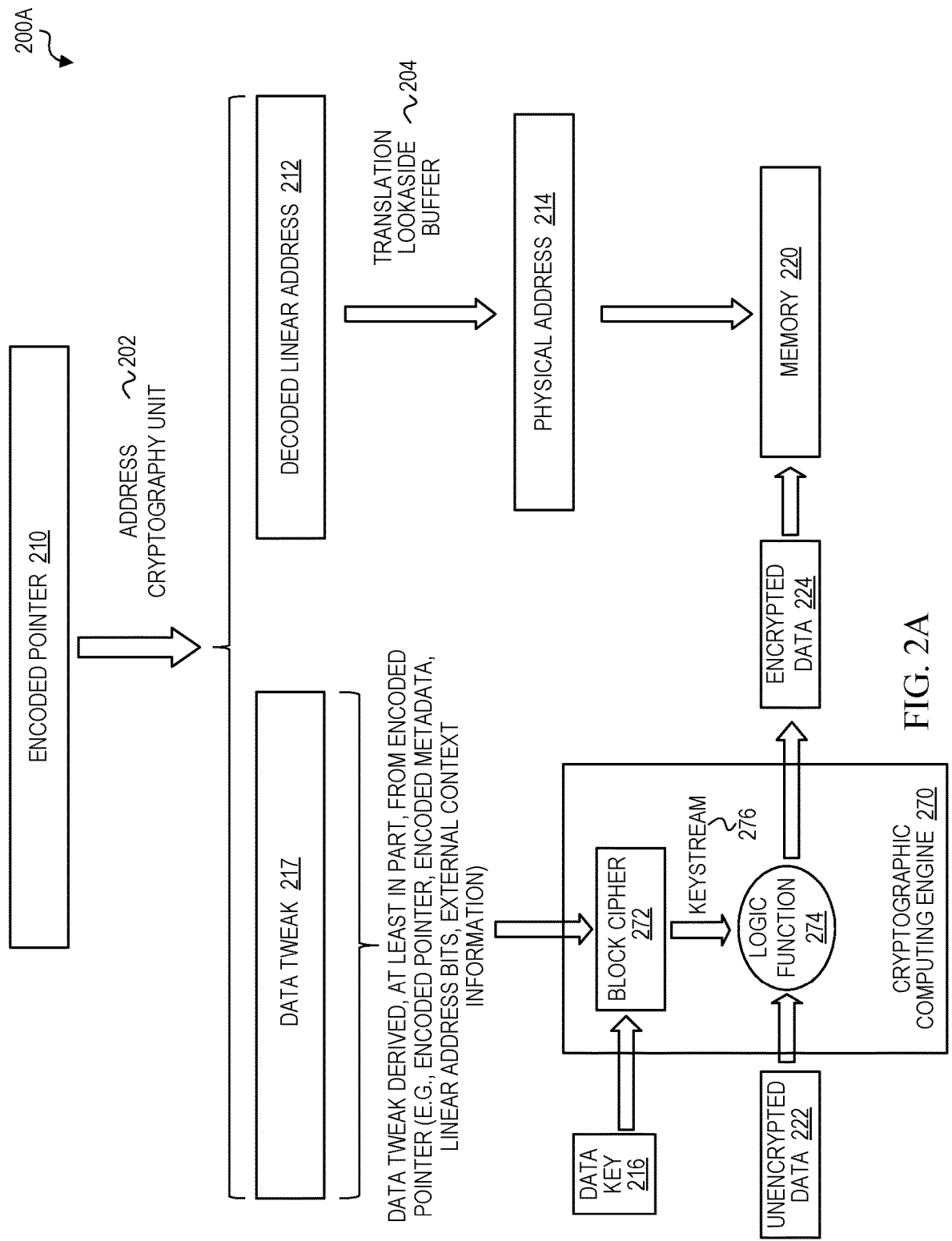
FIG. 2A is flow diagram illustrating a process of binding a generalized encoded pointer to encryption of data referenced by that pointer according to at least one embodiment of the present disclosure.

FIG. 2A is a simplified flow diagram illustrating a general process 200A of cryptographic computing based on embodiments of an encoded pointer 210. Process 200A illustrates storing (e.g., writing) data to a memory region at a memory address indicated by encoded pointer 210, where encryption and decryption of the data is bound to the contents of the pointer according to at least one embodiment. At least some portions of process 200A may be executed by hardware, firmware, and/or software of the computing device 100. In the example shown, pointer 210 is an example of encoded pointer 114 and is embodied as an encoded linear address including a metadata portion. The metadata portion is some type of context information (e.g., size/power metadata, tag, version, etc.) and the linear address may be encoded in any number of possible configurations, at least some of which are described herein.

Encoded pointer 210 may have various configurations according to various embodiments. For example, encoded pointer 210 may be encoded with a plaintext linear address or may be encoded with some plaintext linear address bits and some encrypted linear address bits. Encoded pointer 210 may also be encoded with different metadata depending on the particular embodiment. For example, metadata encoded in encoded pointer 210 may include, but is not necessarily limited to, one or more of size/power metadata, a tag value, or a version number.

Generally, process 200A illustrates a cryptographic computing flow in which the encoded pointer 210 is used to obtain a memory address for a memory region of memory 220 where data is to be stored, and to encrypt the data to be stored based, at least in part, on a tweak derived from the encoded pointer 210. First, address cryptography unit 202 decodes the encoded pointer 210 to obtain a decoded linear address 212. The decoded linear address 212 may be used to obtain a physical address 214 in memory 220 using a translation lookaside buffer 204 or page table (not shown). A data tweak 217 is derived, at least in part, from the encoded pointer 210. For example, the data tweak 217 may include the entire encoded pointer, one or more portions of the encoded pointer, a portion of the decoded linear address, the entire decoded linear address, encoded metadata, and/or external context information (e.g., context information that is not encoded in the pointer).

Once the tweak 217 has been derived from encoded pointer 210, a cryptographic computing engine 270 can compute encrypted data 224 by encrypting unencrypted data 222 based on a data key 216 and the data tweak 217. In at least one embodiment, the cryptographic computing engine 270 includes an encryption algorithm such as a keystream generator, which may be embodied as an AES-CTR mode block cipher 272, at a particular size granularity (any suitable size). In this embodiment, the data tweak 217 may be used as an initialization vector (IV) and a plaintext offset of the encoded pointer 210 may be used as the counter value (CTR). The keystream generator can encrypt the data tweak 217 to produce a keystream 276 and then a cryptographic operation (e.g., a logic function 274 such as an exclusive-or (XOR), or other more complex operations) can be performed on the unencrypted data 222 and the keystream 276 in order to generate encrypted data 224. It should be noted that the generation of the keystream 276 may commence while the physical address 214 is being obtained from the encoded pointer 210. Thus, the parallel operations may increase the efficiency of encrypting the unencrypted data. It should be noted that the encrypted data may be stored to cache (e.g., 170) before or, in some instances instead of, being stored to memory 220.

Figure 2B:
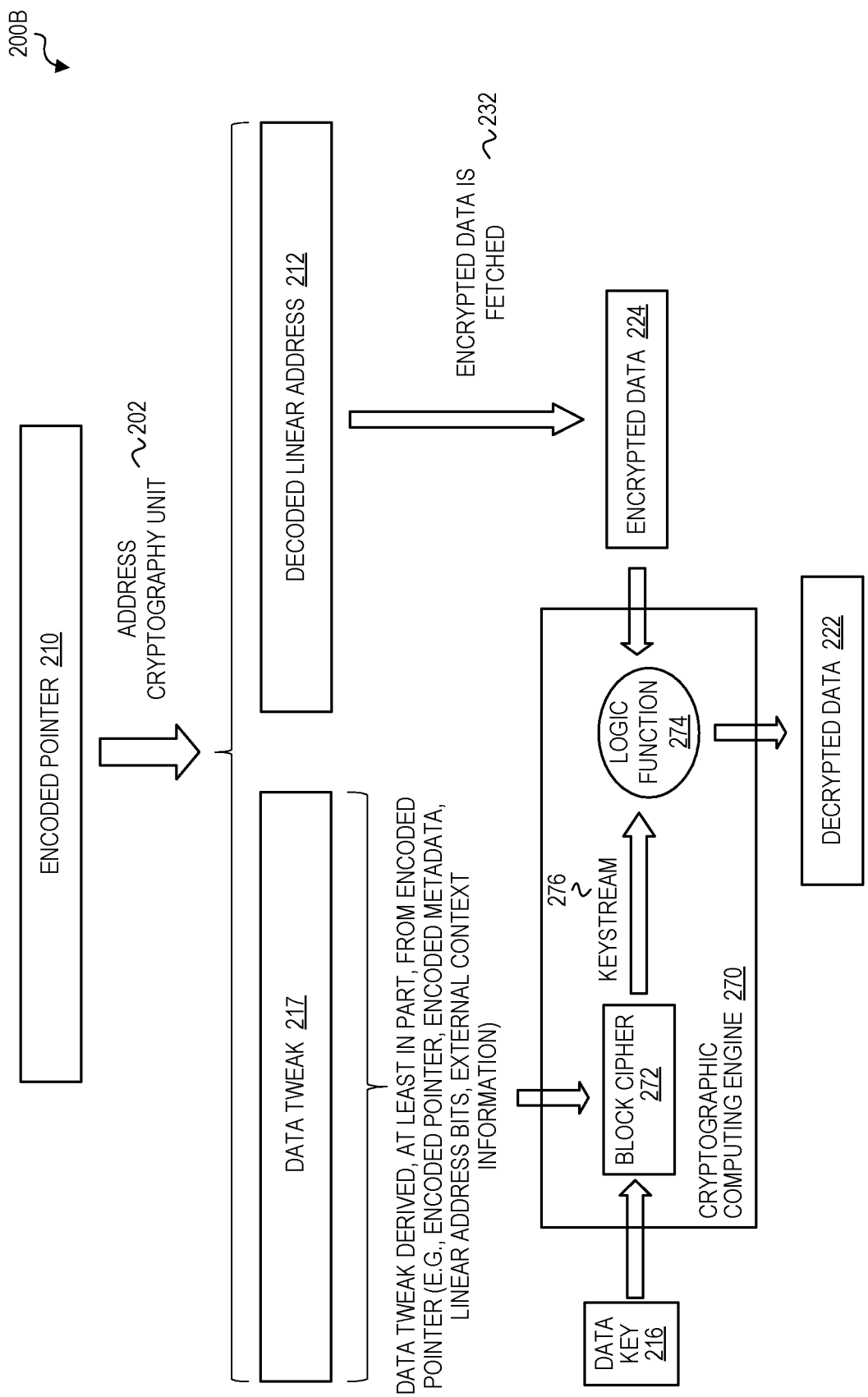
FIG. 2B is flow diagram illustrating a process of decrypting data bound to a generalized encoded pointer according to at least one embodiment of the present disclosure.

FIG. 2B is a simplified flow diagram illustrating a general process 200B of cryptographic computing based on embodiments of encoded pointer 210. Process 200B illustrates obtaining (e.g., reading, loading, fetching) data stored in a memory region at a memory address that is referenced by encoded pointer 210, where encryption and decryption of the data is bound to the contents of the pointer according to at least one embodiment. At least some portions of process 200B may be executed by hardware, firmware, and/or software of the computing device 100.

Generally, process 200B illustrates a cryptographic computing flow in which the encoded pointer 210 is used to obtain a memory address for a memory region of memory 220 where encrypted data is stored and, once the encrypted data is fetched from the memory region, to decrypt the encrypted data based, at least in part, on a tweak derived from the encoded pointer 210. First, address cryptography unit 202 decodes the encoded pointer 210 to obtain the decoded linear address 212, which is used to fetch the encrypted data 224 from memory, as indicated at 232. Data tweak 217 is derived, at least in part, from the encoded pointer 210. In this process 200B for loading/reading data from memory, the data tweak 217 is derived in the same manner as in the converse process 200A for storing/writing data to memory.

Once the tweak 217 has been derived from encoded pointer 210, the cryptographic computing engine 270 can compute decrypted (or unencrypted) data 222 by decrypting encrypted data 224 based on the data key 216 and the data tweak 217. As previously described, in this example, the cryptographic computing engine 270 includes an encryption algorithm such as a keystream generator embodied as AES-CTR mode block cipher 272, at a particular size granularity (any suitable size). In this embodiment, the data tweak 217 may be used as an initialization vector (IV) and a plaintext offset of the encoded pointer 210 may be used as the counter value (CTR). The keystream generator can encrypt the data tweak 217 to produce keystream 276 and then a cryptographic operation (e.g., the logic function 274 such as an exclusive-or (XOR), or other more complex operations) can be performed on the encrypted data 224 and the keystream 276 in order to generate decrypted (or unencrypted) data 222. It should be noted that the generation of the keystream may commence while the encrypted data is being fetched at 232. Thus, the parallel operations may increase the efficiency of decrypting the encrypted data.

The following description pertains to hardening the micro-architecture or design and implementation of a Cryptographic Computing processor feature to avoid creation of new disclosure primitives via speculative execution. In particular, embodiments herein provide a transient side channel aware memory pipeline in the processor for implementing cryptographic computing at a minimal performance cost. This involves, in some embodiments, restrictions around load operation updates to different micro-architectural structures when an address is speculated via a speculative translation lookaside buffer (TLB) mechanism. In addition, embodiments herein provide additions in the memory pipeline to avoid any timing channel creation in the first instance.

In cryptographic computing embodiments, a Translation Lookaside Buffer (TLB) may be used that maps linear addresses (which may also be referred to as virtual addresses) to physical addresses. A TLB entry is populated after a page miss where a page walk of the paging structures determines the correct linear to physical memory mapping, caching the linear to physical mapping for fast lookup.

Figure 3:
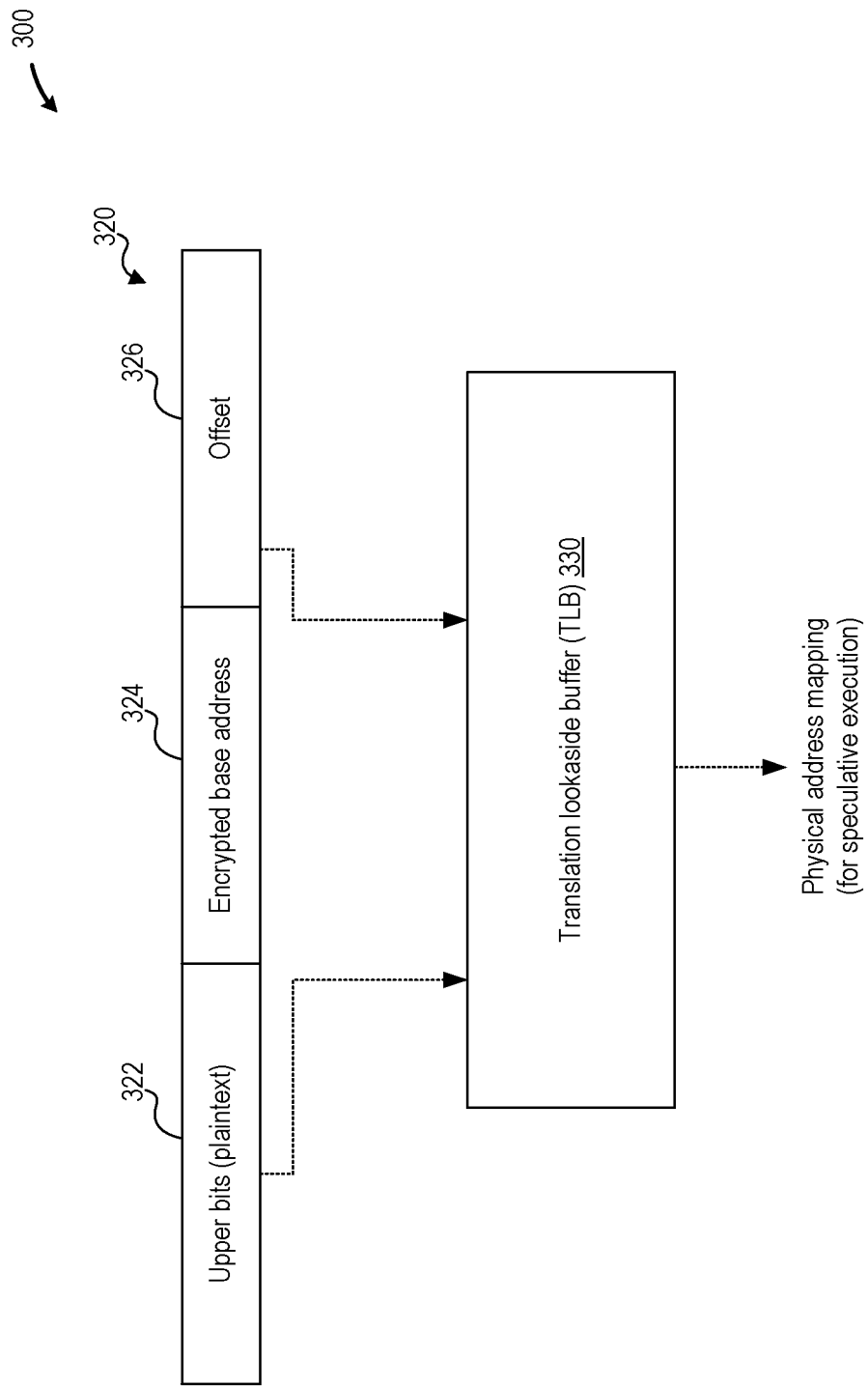
FIG. 3 illustrates an example speculative translation lookaside buffer (TLB) technique according to at least one embodiment of the present disclosure.

Referring to FIG. 3, for instance, a TLB 330 (for example, the data TLB or dTLB) may use one or both of the offset 326 and plaintext upper bits 322 of the encoded pointer 320 as a partial linear address mapping into the TLB (that is, the TLB lookup is performed only against plaintext bits of the encoded pointer 320), and proceed to use the physical memory translation, if found, for speculative execution. The full decrypted base address (including the decrypted version of the encrypted base address 324) may be later verified to determine whether the full linear address is a match (i.e., a TLB hit) after completion of the decryption of the encrypted base address 324. Such embodiments may speculatively proceed with processing and nuke the processor pipeline if the final decrypted linear address match is found to be different from the speculative TLB lookup using the subset of bits of the encoded pointer 320, preventing the execution of dependent instructions, or cleaning up the execution of dependent instructions by returning processor register state and/or memory to its prior state before the TLB misprediction (incorrect memory mapping).

However, this speculative TLB lookup mechanism can act as an additional timing channel whereby a correct TLB lookup is distinguished from an incorrect TLB lookup, thereby leaking one or a few bits of a secret value. For instance, considering the following code:

```
X=Id(A)
If(!X) {
    secret = Id1(addr1);
    B = Id2(F(secret));
    C = F1(B);
    D = F2(C);
}
``` the conditional if statement related to the value X can create a window of transient execution (through a mis-prediction in the branch condition) in which a side channel attack can occur. In the example code above, a secret value is loaded from a first address (addr1), and then used as an input to a function (F) to generate a second address (addr2) for a second load. There are additional operations C and D which can cause timing differences for the code depending on whether the speculative TLB lookup was correct. For instance, the code may take a much longer time to execute (by design of operations B, C, and/or D) if the speculative TLB lookup for the first address is incorrect than if the speculative TLB lookup for the first address is correct. This timing difference can be exploited by an attacker, allowing them to leak the correct secret value (i.e., a side channel attack).

In the above example, the attacker's capabilities are assumed to be 1) priming and monitoring micro-arch structures (e.g., DTLB arrays, data cache units (DCUs), hardware predictors, etc.) for any persistent state changes, and 2) potentially being able to monitor the impact of the timing difference on any further instruction execution (e.g. F1 and F2 above), and thereby, data dependent resource usage. To address these vulnerabilities, embodiments herein may prevent any persistent state changes along the speculative TLB lookup (predicted) load, until the load is considered "safe" (e.g., after all previous branches have resolved correctly or after some other policy applicable to some threat model has been satisfied such as that the address input into the memory access was computed from values for which type safety checks passed). For example, in some embodiments, an indication of an initial error in the corresponding load buffer entry may be kept (and execution can still complete), with the architectural predictor structures being updated once the load becomes "safe", e.g., after a separate pass through the memory pipeline.

Figure 4:
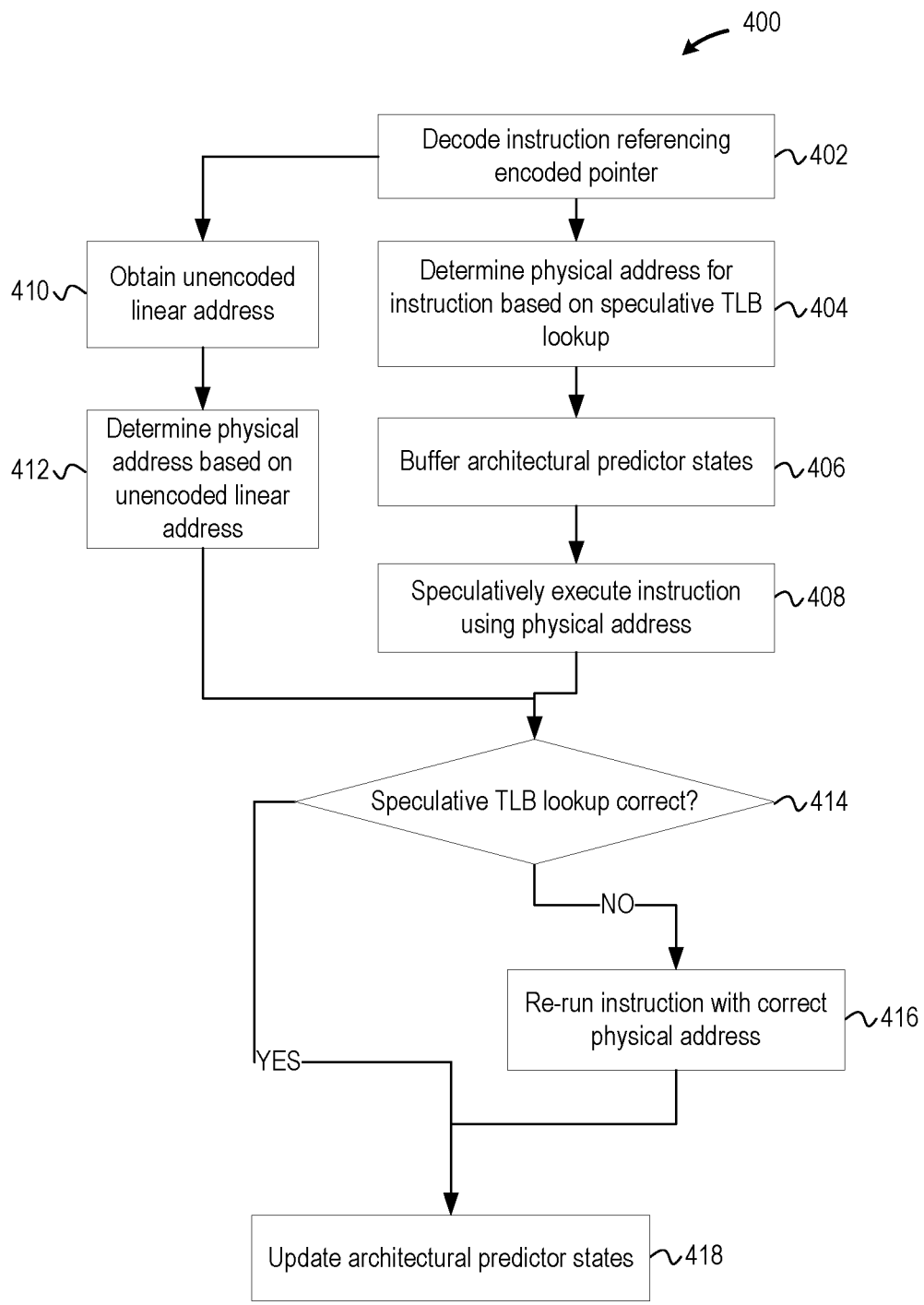
FIG. 4 illustrates a flow diagram of an example process of performing a speculative TLB lookup according to at least one embodiment of the present disclosure.

FIG. 4 illustrates a flow diagram of an example process 400 of performing a speculative TLB lookup according to at least one embodiment of the present disclosure. Aspects of the example process 400 may be performed by a processor that includes a cryptographic execution unit (e.g., processor 102 of FIG. 1). The example process 400 may include additional or different operations, and the operations may be performed in the order shown or in another order. In some cases, one or more of the operations shown in FIG. 4 are implemented as processes that include multiple operations, sub-processes, or other types of routines. In some cases, operations can be combined, performed in another order, performed in parallel, iterated, or otherwise repeated or performed in another manner.

Figure 6:
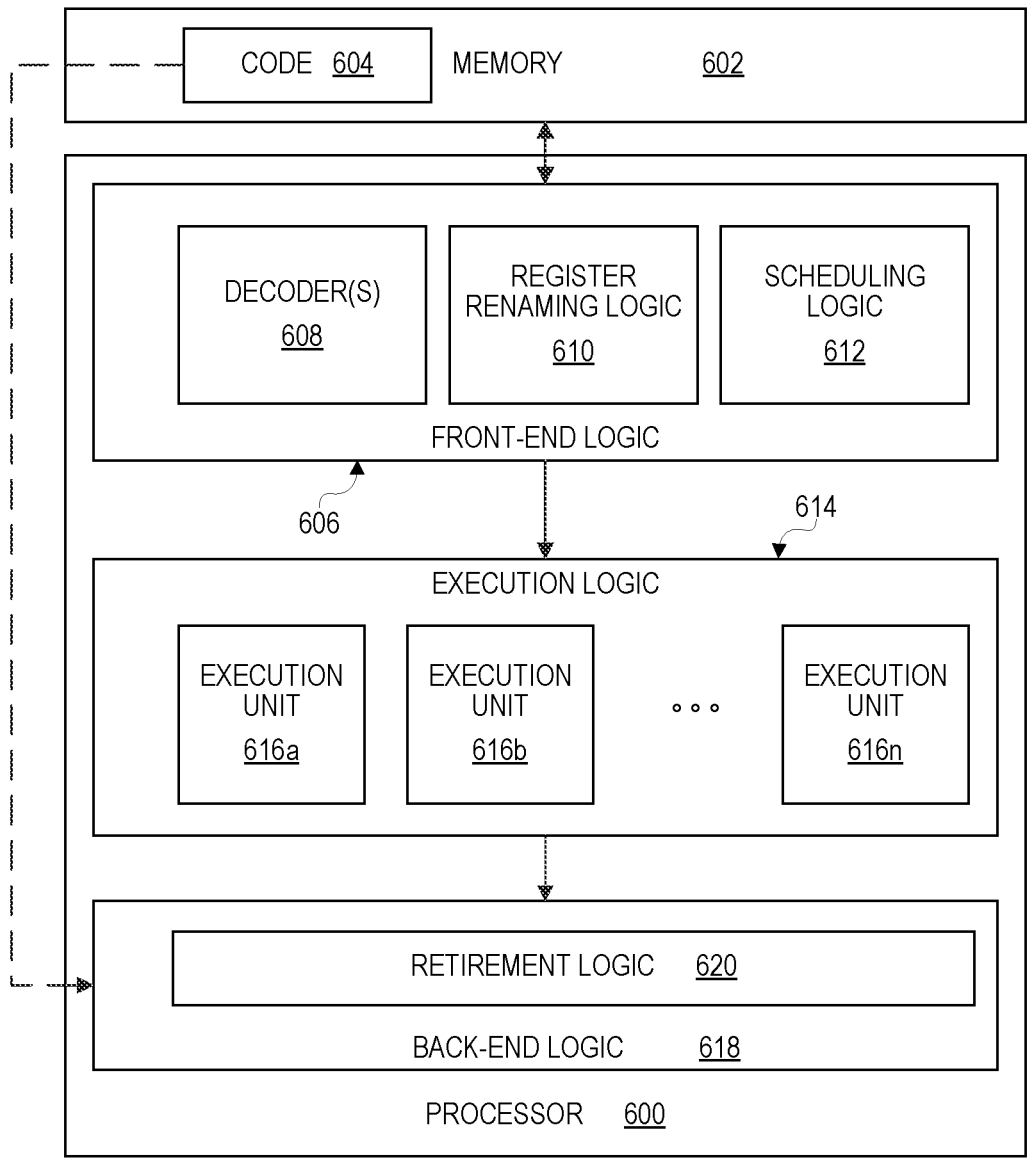
FIG. 6 is a block diagram illustrating an example processor according to at least one embodiment.

At 402, an instruction referencing a decoded pointer to a linear address is decoded by a front end of a processor (e.g., front-end logic 606 of FIG. 6). The encoded pointer may be formatted similar to the pointer 320 of FIG. 3 in that it may include a plaintext portion (e.g., 322) and a ciphertext/encrypted portion (e.g., 324). In some embodiments, at least part of the linear address bits may be encrypted and included in the encrypted portion of the encoded pointer.

At 404, a speculative TLB lookup is performed to determine a corresponding physical address for the linear address of the encoded pointer. The speculative TLB lookup may be considered as speculative because it is to be performed using a subset of the linear address bits of the encoded pointer that are not encrypted while the remaining linear address bits are encrypted; thus, the full linear address is not yet available.

At 406, architectural predictor states generated by the speculative TLB lookup are buffered, instead of being updated in the processor architecture. The architectural predictor states to be buffered at 406 may include those that can be used. Some example states that may be buffered at 406 include a data cache unit LRU state and a data TLB (DTLB) LRU state.

At 408, the instruction decoded at 402 is speculatively executed using the physical address provided by the speculative TLB lookup performed at 404. While the speculative execution is occurring, at 410, the full unencoded linear address is obtained from the encoded pointer, and at 412, a TLB lookup is performed to determine the actual physical address corresponding to the linear address obtained at 410.

At 412, it is determined whether the speculative TLB lookup performed at 404 was correct based on the actual physical address determined at 412. If the speculative TLB lookup was incorrect, the instruction is re-run through the processor or otherwise re-executed using the correct physical address. On the re-execution of the instruction, the architectural predictor states may not be buffered (since the actual physical address is resolved) and the states may be updated at 418. If the speculative TLB lookup was correct at 404, then the buffered architectural predictor states are updated at 418. In this way, the architectural predictor states may only be updated once the speculative window created by the speculative TLB lookup has been closed, preventing a side channel attack window from ever being created.

As another approach to solving the side channel problem with speculative TLB lookups, if encoded pointer decryption has a lower latency than the time when any persistent state updates happen. For example, in some processor pipeline architecture where the first state update happens at the third cycle in a load/store execution, if encoded pointer decryption has a two-cycle latency, then no changes may be required in the pipeline as all updates happen beyond the time when the decrypted address is available. Thus, a two-cycle lightweight cipher can be integrated in the memory pipeline to avoid persistent changes to the architectural predictor structures during speculative execution. For another example, in some processor pipeline architecture where the first state update happens at the fourth cycle in a load/store execution, if encoded pointer decryption has a three-cycle latency, then no changes may be required in the pipeline as all updates happen beyond the time when the decrypted address is available. Thus, a three-cycle lightweight cipher can be integrated in the memory pipeline to avoid persistent changes to the architectural predictor structures during speculative execution.

As another approach, if there is a history array for tracking load characteristics with respect to the speculative TLB lookup performance, the memory pipeline may be augmented as follows to prevent the history array from becoming a disclosure primitive. When the speculative TLB lookup result is analyzed at 412 in FIG. 4 (i.e., after the address has been fully decrypted/decoded from the encoded pointer), the history array will not be updated with a confidence value until the corresponding load operation is considered "safe" according to some policy applicable to some threat model. For example, similar to the embodiments above, one can chose not to update the predictor structures at all for a speculative load or may keep the history value in a load buffer entry and may update the history array once the load is considered safe, e.g., after a separate special memory pipeline cycle.

For an attacker that can monitor any data dependent resource usage in the processor pipeline, the creation of a new timing channel can be avoided by not permitting any bad lookup in the memory pipeline with partial address bits to progress in the pipeline. Thus, in some embodiments, the decryption of the encoded pointer can happen in the address generation unit (AGU) and can be complete by the time it hits the TLB lookup, so no further progress with any bad DTLB lookup is possible. In some embodiments, the pointer decryption logic may be placed at the interface of the AGU and memory pipeline.

FIGS. 5-9 below provide some example computing devices, computing environments, hardware, software or flows that may be used in the context of embodiments as described herein.

Figure 5:
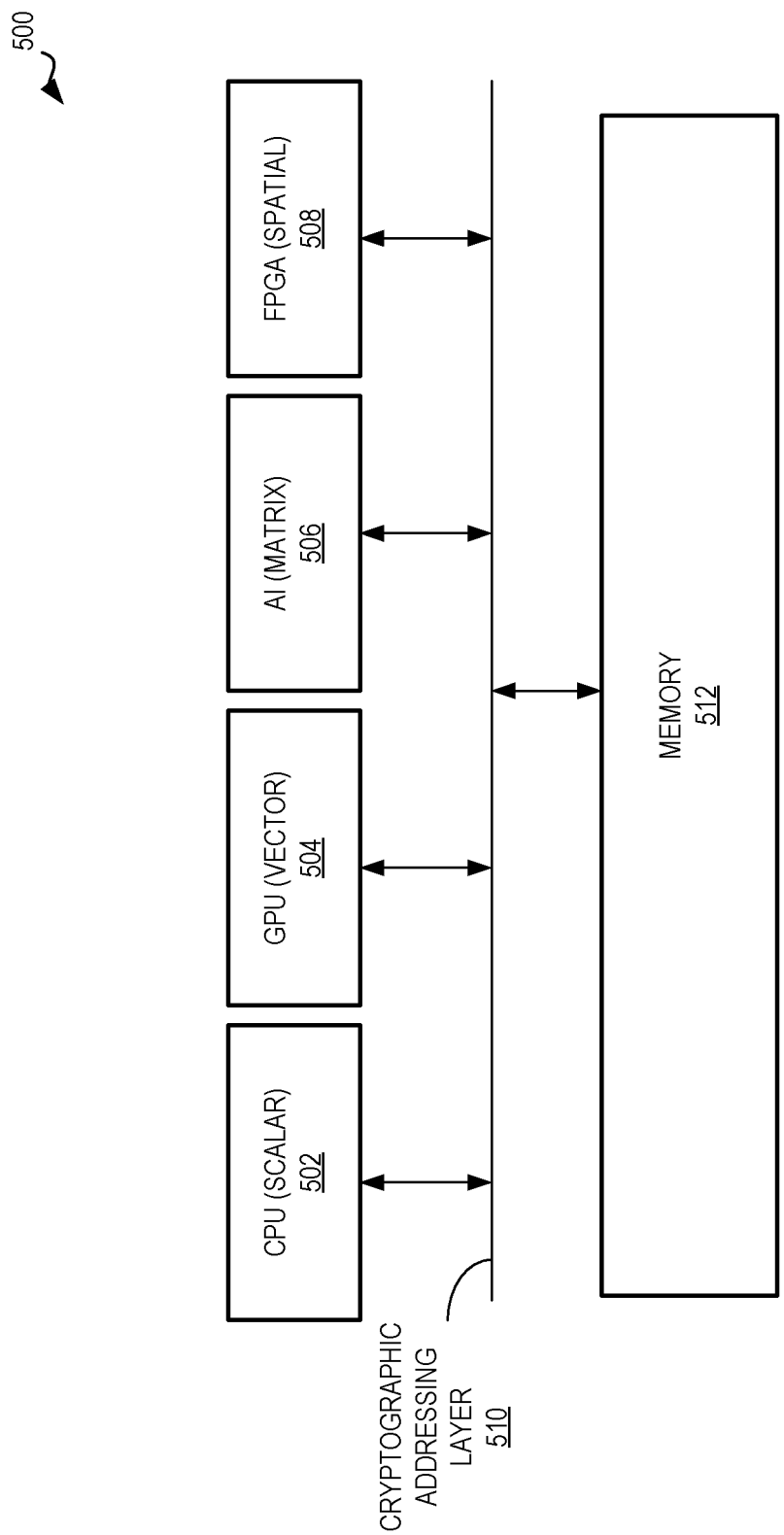
FIG. 5 is a block diagram illustrating an example cryptographic computing environment according to at least one embodiment.

FIG. 5 is a block diagram illustrating an example cryptographic computing environment 500 according to at least one embodiment. In the example shown, a cryptographic addressing layer 510 extends across the example compute vectors central processing unit (CPU) 502, graphical processing unit (GPU) 504, artificial intelligence (AI) 506, and field programmable gate array (FPGA) 508. For example, the CPU 502 and GPU 504 may share the same virtual address translation for data stored in memory 512, and the cryptographic addresses may build on this shared virtual memory. They may share the same process key for a given execution flow, and compute the same tweaks to decrypt the cryptographically encoded addresses and decrypt the data referenced by such encoded addresses, following the same cryptographic algorithms.

Combined, the capabilities described herein may enable cryptographic computing. Memory 512 may be encrypted at every level of the memory hierarchy, from the first level of cache through last level of cache and into the system memory. Binding the cryptographic address encoding to the data encryption may allow extremely fine-grain object boundaries and access control, enabling fine grain secure containers down to even individual functions and their objects for function-as-a-service. Cryptographically encoding return addresses on a call stack (depending on their location) may also enable control flow integrity without the need for shadow stack metadata. Thus, any of data access control policy and control flow can be performed cryptographically, simply dependent on cryptographic addressing and the respective cryptographic data bindings.

Figure 7:
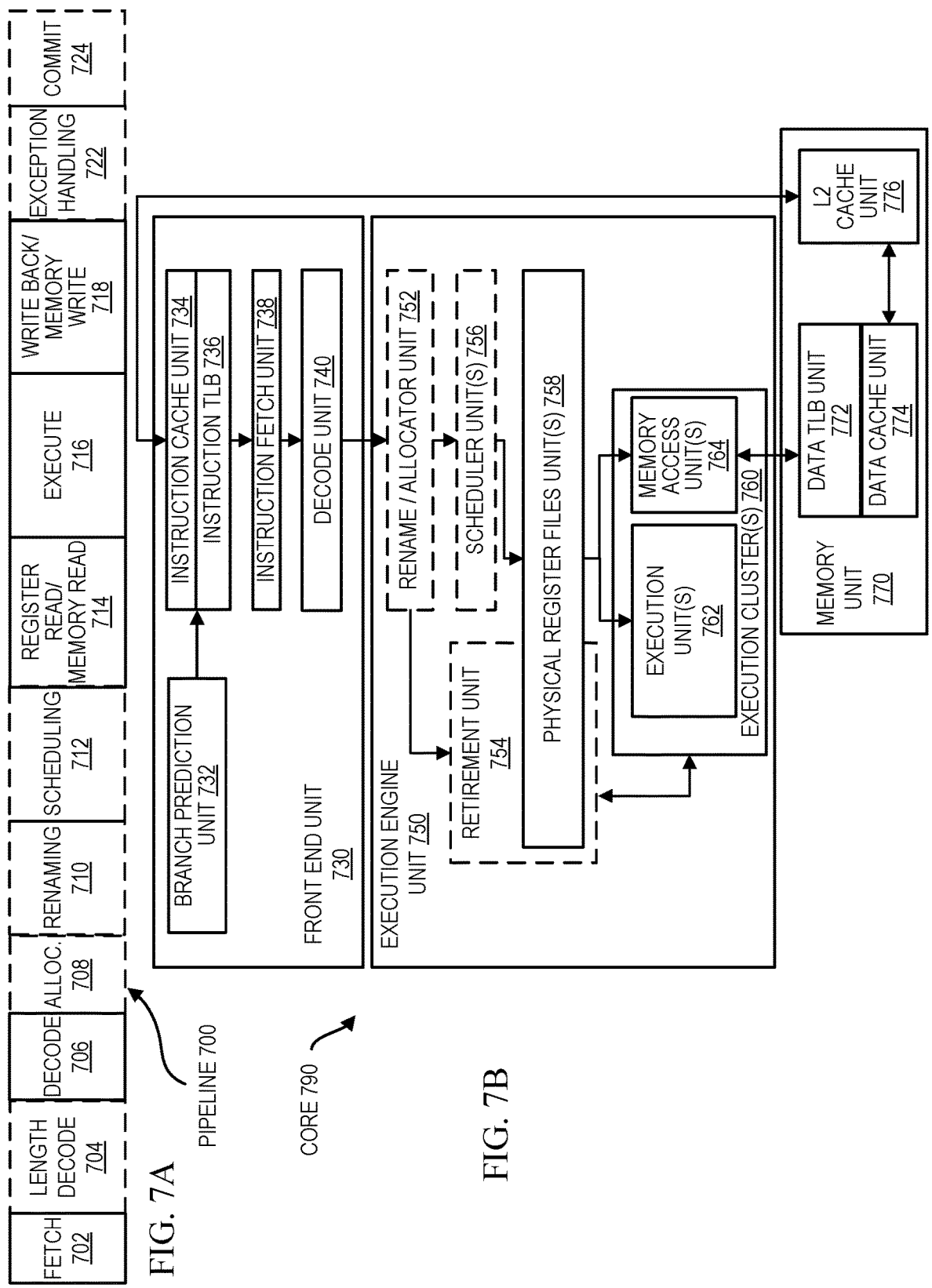
FIG. 7A is a block diagram illustrating both an exemplary in-order pipeline and an exemplary register renaming, out-of-order issue/execution pipeline in accordance with certain embodiments.
FIG. 7B is a block diagram illustrating both an exemplary embodiment of an in-order architecture core and an exemplary register renaming, out-of-order issue/execution architecture core to be included in a processor in accordance with certain embodiments.
Figure 8:
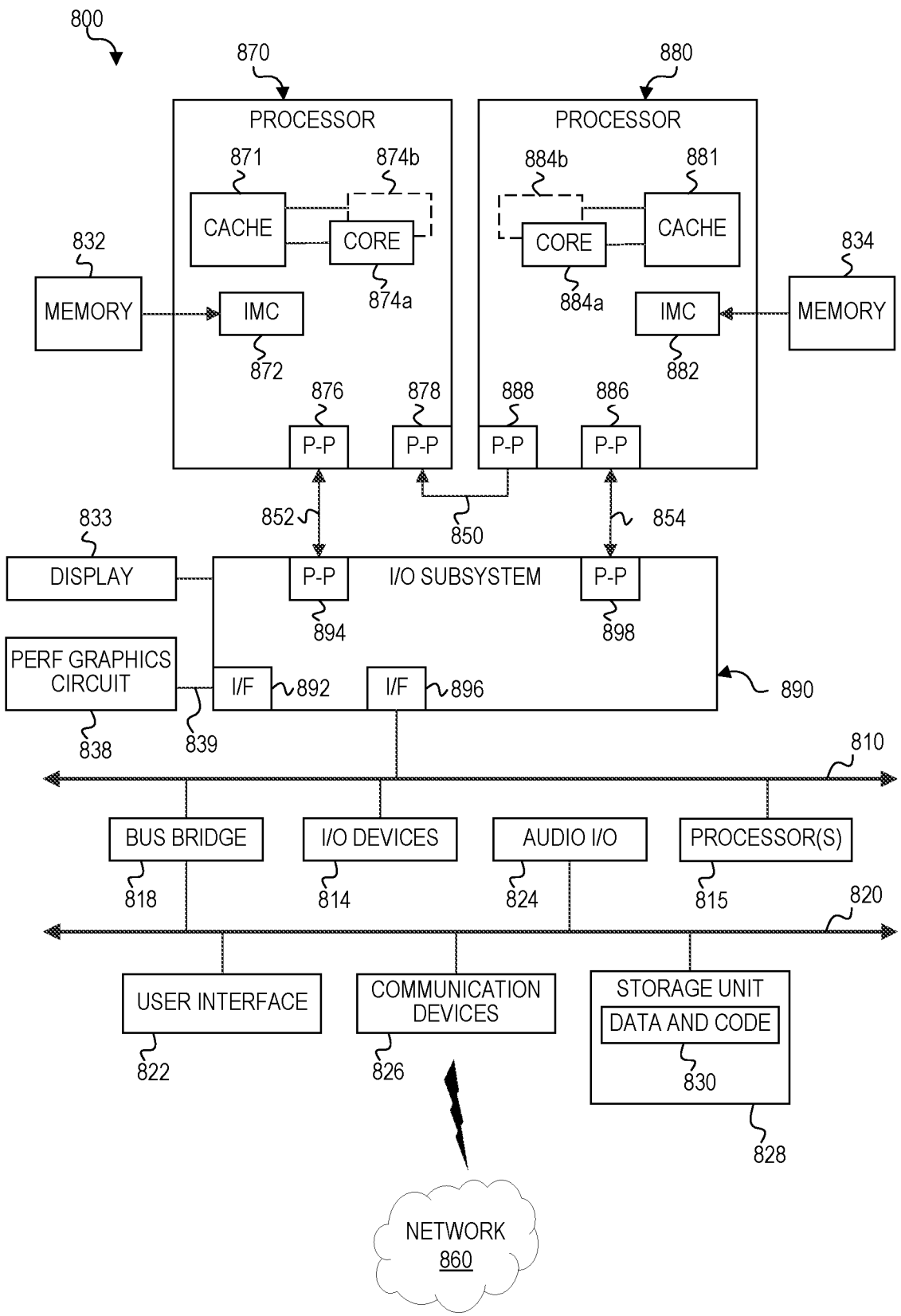
FIG. 8 is a block diagram of an example computer architecture according to at least one embodiment.

FIGS. 6-8 are block diagrams of exemplary computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 6-8.

FIG. 6 is an example illustration of a processor according to an embodiment. Processor 600 is an example of a type of hardware device that can be used in connection with the implementations shown and described herein (e.g., processor 102). Processor 600 may be any type of processor, such as a microprocessor, an embedded processor, a digital signal processor (DSP), a network processor, a multi-core processor, a single core processor, or other device to execute code. Although only one processor 600 is illustrated in FIG. 6, a processing element may alternatively include more than one of processor 600 illustrated in FIG. 6. Processor 600 may be a single-threaded core or, for at least one embodiment, the processor 600 may be multi-threaded in that it may include more than one hardware thread context (or "logical processor") per core.

FIG. 6 also illustrates a memory 602 coupled to processor 600 in accordance with an embodiment. Memory 602 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 600 can execute any type of instructions associated with algorithms, processes, or operations detailed herein. Generally, processor 600 can transform an element or an article (e.g., data) from one state or thing to another state or thing.

Code 604, which may be one or more instructions to be executed by processor 600, may be stored in memory 602, or may be stored in software, hardware, firmware, or any suitable combination thereof, or in any other internal or external component, device, element, or object where appropriate and based on particular needs. In one example, processor 600 can follow a program sequence of instructions indicated by code 604. Each instruction enters a front-end logic 606 and is processed by one or more decoders 608. The decoder may generate, as its output, a micro operation such as a fixed width micro operation in a predefined format, or may generate other instructions, microinstructions, or control signals that reflect the original code instruction. Front-end logic 606 also includes register renaming logic 610 and scheduling logic 612, which generally allocate resources and queue the operation corresponding to the instruction for execution.

Processor 600 can also include execution logic 614 having a set of execution units 616a, 616b, 616n, etc. Some embodiments may include a number of execution units dedicated to specific functions or sets of functions. Other embodiments may include only one execution unit or one execution unit that can perform a particular function. Execution logic 614 performs the operations specified by code instructions.

After completion of execution of the operations specified by the code instructions, back-end logic 618 can retire the instructions of code 604. In one embodiment, processor 600 allows out of order execution but requires in order retirement of instructions. Retirement logic 620 may take a variety of known forms (e.g., re-order buffers or the like). In this manner, processor 600 is transformed during execution of code 604, at least in terms of the output generated by the decoder, hardware registers and tables utilized by register renaming logic 610, and any registers (not shown) modified by execution logic 614.

Although not shown in FIG. 6, a processing element may include other elements on a chip with processor 600. For example, a processing element may include memory control logic along with processor 600. The processing element may include I/O control logic and/or may include I/O control logic integrated with memory control logic. The processing element may also include one or more caches. In some embodiments, non-volatile memory (such as flash memory or fuses) may also be included on the chip with processor 600.

FIG. 7A is a block diagram illustrating both an exemplary in-order pipeline and an exemplary register renaming, out-of-order issue/execution pipeline according to one or more embodiments of this disclosure. FIG. 7B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 7A-7B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. Processor core 790 and memory unit 770 are examples of the types of hardware that can be used in connection with the implementations shown and described herein (e.g., processor 102, memory 120). The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like. In addition, processor core 790 and its components represent example architecture that could be used to implement logical processors and their respective components.

The front end unit 730 includes a branch prediction unit 732 coupled to an instruction cache unit 734, which is coupled to an instruction translation lookaside buffer (TLB) unit 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers (GPRs). In at least some embodiments described herein, register units 758 are examples of the types of hardware that can be used in connection with the implementations shown and described herein (e.g., registers 110). The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 762 may also include an address generation unit to calculate addresses used by the core to access main memory (e.g., memory unit 770) and a page miss handler (PMH).

The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory. In addition, a page miss handler may also be included in core 790 to look up an address mapping in a page table if no match is found in the data TLB unit 772.

By way of example, the exemplary register renaming, out-of-order issue/execution core architecture may implement the pipeline 700 as follows: 1) the instruction fetch unit 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the scheduling stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 8 illustrates a computing system 800 that is arranged in a point-to-point (PtP) configuration according to an embodiment. In particular, FIG. 8 shows a system where processors, memory, and input/output devices are interconnected by a number of point-to-point interfaces. Generally, one or more of the computing systems or computing devices described herein may be configured in the same or similar manner as computing system 800.

Processors 870 and 880 may be implemented as single core processors 874*a* and 884*a* or multi-core processors 874*a*-874*b* and 884*a*-884*b*. Processors 870 and 880 may each include a cache 871 and 881 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 800. Moreover, processors 870 and 880 are examples of the types of hardware that can be used in connection with the implementations shown and described herein (e.g., processor 102).

Processors 870 and 880 may also each include integrated memory controller logic (IMC) 872 and 882 to communicate with memory elements 832 and 834, which may be portions of main memory locally attached to the respective processors. In alternative embodiments, memory controller logic 872 and 882 may be discrete logic separate from processors 870 and 880. Memory elements 832 and/or 834 may store various data to be used by processors 870 and 880 in achieving operations and functionality outlined herein.

Processors 870 and 880 may be any type of processor, such as those discussed in connection with other figures. Processors 870 and 880 may exchange data via a point-to-point (PtP) interface 850 using point-to-point interface circuits 878 and 888, respectively. Processors 870 and 880 may each exchange data with an input/output (I/O) subsystem 890 via individual point-to-point interfaces 852 and 854 using point-to-point interface circuits 876, 886, 894, and 898. I/O subsystem 890 may also exchange data with a high-performance graphics circuit 838 via a high-performance graphics interface 839, using an interface circuit 892, which could be a PtP interface circuit. In one embodiment, the high-performance graphics circuit 838 is a special-purpose processor, such as, for example, a high-throughput MIC processor, a network or communication processor, compression engine, graphics processor, GPGPU, embedded processor, or the like. I/O subsystem 890 may also communicate with a display 833 for displaying data that is viewable by a human user. In alternative embodiments, any or all of the PtP links illustrated in FIG. 8 could be implemented as a multi-drop bus rather than a PtP link.

I/O subsystem 890 may be in communication with a bus 810 via an interface circuit 896. Bus 810 may have one or more devices that communicate over it, such as a bus bridge 818, I/O devices 814, and one or more other processors 815. Via a bus 820, bus bridge 818 may be in communication with other devices such as a user interface 822 (such as a keyboard, mouse, touchscreen, or other input devices), communication devices 826 (such as modems, network interface devices, or other types of communication devices that may communicate through a computer network 860), audio I/O devices 824, and/or a storage unit 828. Storage unit 828 may store data and code 830, which may be executed by processors 870 and/or 880. In alternative embodiments, any portions of the bus architectures could be implemented with one or more PtP links.

Program code, such as code 830, may be applied to input instructions to perform the functions described herein and generate output information. The output information may be applied to one or more output devices, in known fashion. For purposes of this application, a processing system may be part of computing system 800 and includes any system that has a processor, such as, for example; a digital signal processor (DSP), a microcontroller, an application specific integrated circuit (ASIC), or a microprocessor.

The program code (e.g., 830) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 9:
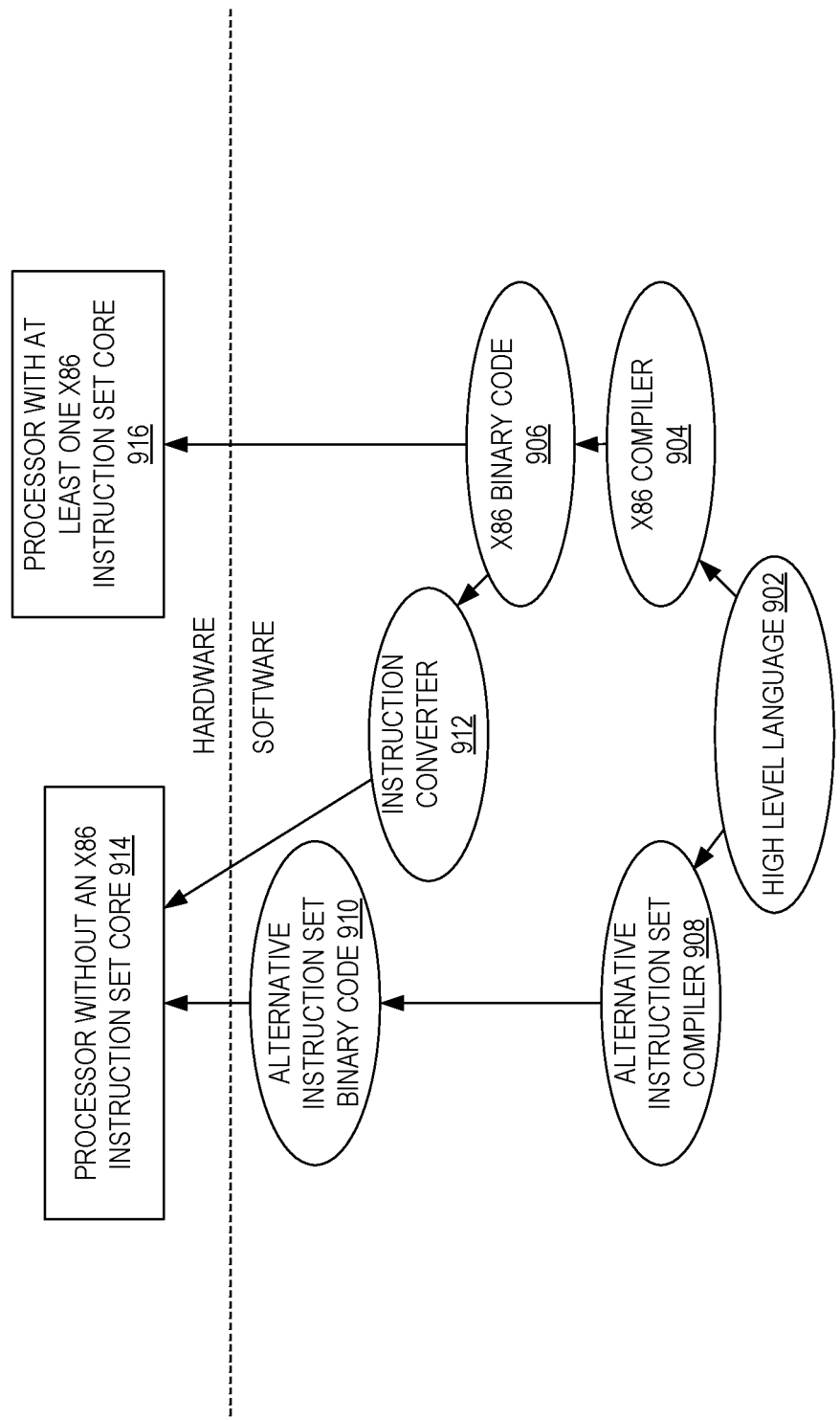
FIG. 9 is a block diagram contrasting the use of a software instruction converter to convert binary instructions in a source instruction set to binary instructions in a target instruction set according to embodiments of the present disclosure.

FIG. 9 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 9 shows a program in a high level language 902 may be compiled using an x86 compiler 904 to generate x86 binary code 906 that may be natively executed by a processor with at least one x86 instruction set core 916. The processor with at least one x86 instruction set core 916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 904 represents a compiler that is operable to generate x86 binary code 906 (e.g., object code) that can, with or without additional linkage processing, be executed on the processor with at least one x86 instruction set core 916. Similarly, FIG. 9 shows the program in the high level language 902 may be compiled using an alternative instruction set compiler 908 to generate alternative instruction set binary code 910 that may be natively executed by a processor without at least one x86 instruction set core 914 (e.g., a processor with cores that execute the MIPS instruction set of MIPS Technologies of Sunnyvale, CA and/or that execute the ARM instruction set of ARM Holdings of Sunnyvale, CA). The instruction converter 912 is used to convert the x86 binary code 906 into code that may be natively executed by the processor without an x86 instruction set core 914. This converted code is not likely to be the same as the alternative instruction set binary code 910 because an instruction converter capable of this is difficult to make; however, the converted code will accomplish the general operation and be made up of instructions from the alternative instruction set. Thus, the instruction converter 912 represents software, firmware, hardware, or a combination thereof that, through emulation, simulation or any other process, allows a processor or other electronic device that does not have an x86 instruction set processor or core to execute the x86 binary code 906.

One or more aspects of at least one embodiment may be implemented by representative instructions stored on a machine readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine readable media containing instructions or containing design data, such as Hardware Description Language (HDL), which defines structures, circuits, apparatuses, processors and/or system features described herein. Such embodiments may also be referred to as program products.

The computing system depicted in FIG. 9 is a schematic illustration of an embodiment of a computing system that may be utilized to implement various embodiments discussed herein. It will be appreciated that various components of the system depicted in FIG. 9 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

EXAMPLES

Example 1 is a processor comprising: a memory hierarchy; and a core comprising circuitry to: decode an instruction referencing an encoded data pointer, the encoded data pointer comprising a set of plaintext linear address bits and a set of encrypted linear address bits; perform a speculative lookup in a translation lookaside buffer (TLB) using the plaintext linear address bits to obtain physical address; buffer a set of architectural predictor state values based on the speculative TLB lookup; speculatively execute the instruction using the physical address obtained from the speculative TLB lookup; determine whether the speculative TLB lookup was correct; and based on a determination that the speculative TLB lookup was correct, update a set of architectural predictor state values of the core using the buffered architectural predictor state values.

Example 2 includes the subject matter of Example 1, wherein the physical address is a first physical address, and the circuitry is further to: decrypt the encrypted linear address bits; determine a full linear address based on the plaintext linear address bits and decrypted linear address bits; and perform a lookup in the TLB using the full linear address to obtain a second physical address; wherein the determination of whether the speculative TLB lookup was correct is based on a comparison of the first and second physical addresses.

Example 3 includes the subject matter of Example 1 or 2, wherein the circuitry is further to re-execute the instruction using the second linear address based on a determination that the speculative TLB lookup was incorrect.

Example 4 includes the subject matter of Example 3, wherein the circuitry is to update the set of architectural predictor state values of the core based on the re-executed instruction without buffering the architectural predictor state values.

Example 5 includes the subject matter of any one of Examples 1-4, wherein the set of architectural predictor state values of the core include one or more of a last recently used (LRU) cache state and a LRU translation lookaside buffer (TLB) state.

Example 6 includes a method comprising: decoding an instruction referencing an encoded data pointer, the encoded data pointer comprising a set of plaintext linear address bits and a set of encrypted linear address bits; performing a speculative lookup in a translation lookaside buffer (TLB) using the plaintext linear address bits to obtain physical address; buffering a set of architectural predictor state values based on the speculative TLB lookup; speculatively executing the instruction using the physical address obtained from the speculative TLB lookup; determining whether the speculative TLB lookup was correct; and based on a determination that the speculative TLB lookup was correct, updating a set of architectural predictor state values of the core using the buffered architectural predictor state values.

Example 7 includes the subject matter of Example 6, wherein the physical address is a first physical address, and the method further comprises: decrypting the encrypted linear address bits; determining a full linear address based on the plaintext linear address bits and decrypted linear address bits; and performing a lookup in the TLB using the full linear address to obtain a second physical address; wherein the determination of whether the speculative TLB lookup was correct is based on a comparison of the first and second physical addresses.

Example 8 includes the subject matter of Example 6 or 7, further comprising re-executing the instruction using the second linear address based on a determination that the speculative TLB lookup was incorrect.

Example 9 includes the subject matter of Example 8, wherein updating the set of architectural predictor state values of the core is based on the re-executed instruction without buffering the architectural predictor state values.

Example 10 includes the subject matter of any one of Examples 6-9, wherein the set of architectural predictor state values of the core include one or more of a last recently used (LRU) cache state and a LRU translation lookaside buffer (TLB) state.

Example 10.5 includes an apparatus comprising means to perform the method of any preceding Example.

Example 11 includes one or more non-transitory computer-readable media comprising instructions to cause an electronic device, upon execution of the instructions by one or more processors of the electronic device, to: access an instruction referencing an encoded data pointer, the encoded data pointer comprising a set of plaintext linear address bits and a set of encrypted linear address bits; perform a speculative lookup in a translation lookaside buffer (TLB) using the plaintext linear address bits to obtain physical address; buffer a set of architectural predictor state values based on the speculative TLB lookup; speculatively execute the instruction using the physical address obtained from the speculative TLB lookup; determine whether the speculative TLB lookup was correct; and based on a determination that the speculative TLB lookup was correct, update a set of architectural predictor state values of the core using the buffered architectural predictor state values.

Example 12 includes the subject matter of Example 11, wherein the physical address is a first physical address, and the instructions are further to: decrypt the encrypted linear address bits; determine a full linear address based on the plaintext linear address bits and decrypted linear address bits; and perform a lookup in the TLB using the full linear address to obtain a second physical address; wherein the determination of whether the speculative TLB lookup was correct is based on a comparison of the first and second physical addresses.

Example 13 includes the subject matter of Example 11 or 12, wherein the instructions are further to re-execute the instruction using the second linear address based on a determination that the speculative TLB lookup was incorrect.

Example 14 includes the subject matter of Example 13, wherein the instructions are to update the set of architectural predictor state values of the core based on the re-executed instruction without buffering the architectural predictor state values.

Example 15 includes the subject matter of any one of Examples 11-14, wherein the set of architectural predictor state values of the core include one or more of a last recently used (LRU) cache state and a LRU translation lookaside buffer (TLB) state.

Example 16 includes system comprising: means for decoding an instruction referencing an encoded data pointer, the encoded data pointer comprising a set of plaintext linear address bits and a set of encrypted linear address bits; means for performing a speculative lookup in a translation lookaside buffer (TLB) using the plaintext linear address bits to obtain physical address; means for buffering a set of architectural predictor state values based on the speculative TLB lookup; means for speculatively executing the instruction using the physical address obtained from the speculative TLB lookup; means for determining whether the speculative TLB lookup was correct; and means for updating a set of architectural predictor state values of the core using the buffered architectural predictor state values based on the determination of whether the speculative TLB lookup was correct.

Example 17 includes the subject matter of Example 16, wherein the physical address is a first physical address, and the system further comprises: means for decrypting the encrypted linear address bits; means for determining a full linear address based on the plaintext linear address bits and decrypted linear address bits; and means for performing a lookup in the TLB using the full linear address to obtain a second physical address; wherein the means for determining whether the speculative TLB lookup was correct are to compare the first and second physical addresses.

Example 18 includes the subject matter of Example 16 or 17, further comprising means for re-executing the instruction using the second linear address based on a determination that the speculative TLB lookup was incorrect.

Example 19 includes the subject matter of Example 18, wherein the means for updating the set of architectural predictor state values of the core are to update the set of architectural predictor state values based on the re-executed instruction without buffering the architectural predictor state values.

Example 20 includes the subject matter of any one of Examples 16-19, wherein the set of architectural predictor state values of the core include one or more of a last recently used (LRU) cache state and a LRU translation lookaside buffer (TLB) state.

The invention claimed is:

1. A processor comprising:
a memory hierarchy; and
a core comprising circuitry to:
decode an instruction referencing an encoded data pointer, the encoded data pointer comprising a set of plaintext linear address bits and a set of encrypted linear address bits;
perform a speculative lookup in a translation lookaside buffer (TLB) using the plaintext linear address bits to obtain physical address;
buffer a set of architectural predictor state values based on the speculative TLB lookup;
speculatively execute the instruction using the physical address obtained from the speculative TLB lookup;
determine whether the speculative TLB lookup was correct; and
based on a determination that the speculative TLB lookup was correct, update a set of architectural predictor state values of the core using the buffered architectural predictor state values.

2. The processor of claim 1, wherein the physical address is a first physical address, and the circuitry is further to:
decrypt the encrypted linear address bits;
determine a full linear address based on the plaintext linear address bits and decrypted linear address bits; and
perform a lookup in the TLB using the full linear address to obtain a second physical address;
wherein the determination of whether the speculative TLB lookup was correct is based on a comparison of the first and second physical addresses.

3. The processor of claim 2, wherein the circuitry is further to re-execute the instruction using the second physical address based on a determination that the speculative TLB lookup was incorrect.

4. The processor of claim 3, wherein the circuitry is to update the set of architectural predictor state values of the core based on the re-executed instruction without buffering the architectural predictor state values.

5. The processor of claim 1, wherein the set of architectural predictor state values of the core include one or more of a last recently used (LRU) cache state and a LRU translation lookaside buffer (TLB) state.

6. A method comprising:
decoding an instruction referencing an encoded data pointer, the encoded data pointer comprising a set of plaintext linear address bits and a set of encrypted linear address bits;
performing a speculative lookup in a translation lookaside buffer (TLB) using the plaintext linear address bits to obtain physical address;
buffering a set of architectural predictor state values based on the speculative TLB lookup;
speculatively executing the instruction using the physical address obtained from the speculative TLB lookup;
determining whether the speculative TLB lookup was correct; and
based on a determination that the speculative TLB lookup was correct, updating a set of architectural predictor state values of a processor core using the buffered architectural predictor state values.

7. The method of claim 6, wherein the physical address is a first physical address, and the method further comprises:
decrypting the encrypted linear address bits;
determining a full linear address based on the plaintext linear address bits and decrypted linear address bits; and
performing a lookup in the TLB using the full linear address to obtain a second physical address;

wherein the determination of whether the speculative TLB lookup was correct is based on a comparison of the first and second physical addresses.

8. The method of claim 7, further comprising re-executing the instruction using the second physical address based on a determination that the speculative TLB lookup was incorrect.

9. The method of claim 8, wherein updating the set of architectural predictor state values of the core is based on the re-executed instruction without buffering the architectural predictor state values.

10. The method of claim 6, wherein the set of architectural predictor state values of the core include one or more of a last recently used (LRU) cache state and a LRU translation lookaside buffer (TLB) state.

11. One or more non-transitory computer-readable media comprising instructions to cause an electronic device, upon execution of the instructions by one or more processors of the electronic device, to:
    access an instruction referencing an encoded data pointer, the encoded data pointer comprising a set of plaintext linear address bits and a set of encrypted linear address bits;
    perform a speculative lookup in a translation lookaside buffer (TLB) using the plaintext linear address bits to obtain physical address;
    buffer a set of architectural predictor state values based on the speculative TLB lookup;
    speculatively execute the instruction using the physical address obtained from the speculative TLB lookup;
    determine whether the speculative TLB lookup was correct; and
    based on a determination that the speculative TLB lookup was correct, update a set of architectural predictor state values of a processor core using the buffered architectural predictor state values.

12. The computer-readable media of claim 11, wherein the physical address is a first physical address, and the instructions are further to:
    decrypt the encrypted linear address bits;
    determine a full linear address based on the plaintext linear address bits and decrypted linear address bits; and
    perform a lookup in the TLB using the full linear address to obtain a second physical address;
    wherein the determination of whether the speculative TLB lookup was correct is based on a comparison of the first and second physical addresses.

13. The computer-readable media of claim 12, wherein the instructions are further to re-execute the instruction using the second physical address based on a determination that the speculative TLB lookup was incorrect.

14. The computer-readable media of claim 13, wherein the instructions are to update the set of architectural predictor state values of the core based on the re-executed instruction without buffering the architectural predictor state values.

15. The computer-readable media of claim 11, wherein the set of architectural predictor state values of the core include one or more of a last recently used (LRU) cache state and a LRU translation lookaside buffer (TLB) state.

16. A system comprising:
    means for decoding an instruction referencing an encoded data pointer, the encoded data pointer comprising a set of plaintext linear address bits and a set of encrypted linear address bits;
    means for performing a speculative lookup in a translation lookaside buffer (TLB) using the plaintext linear address bits to obtain physical address;
    means for buffering a set of architectural predictor state values based on the speculative TLB lookup;
    means for speculatively executing the instruction using the physical address obtained from the speculative TLB lookup;
    means for determining whether the speculative TLB lookup was correct; and
    means for updating a set of architectural predictor state values of a processor core using the buffered architectural predictor state values based on the determination of whether the speculative TLB lookup was correct.

17. The system of claim 16, wherein the physical address is a first physical address, and the system further comprises:
    means for decrypting the encrypted linear address bits;
    means for determining a full linear address based on the plaintext linear address bits and decrypted linear address bits; and
    means for performing a lookup in the TLB using the full linear address to obtain a second physical address;
    wherein the means for determining whether the speculative TLB lookup was correct are to compare the first and second physical addresses.

18. The system of claim 17, further comprising means for re-executing the instruction using the second physical address based on a determination that the speculative TLB lookup was incorrect.

19. The system of claim 18, wherein the means for updating the set of architectural predictor state values of the core are to update the set of architectural predictor state values based on the re-executed instruction without buffering the architectural predictor state values.

20. The system of claim 16, wherein the set of architectural predictor state values of the core include one or more of a last recently used (LRU) cache state and a LRU translation lookaside buffer (TLB) state.

* * * * *